(12) United States Patent
Lee et al.

(10) Patent No.: US 9,046,957 B2
(45) Date of Patent: Jun. 2, 2015

(54) METHOD FOR DISPLAYING PAGES OF E-BOOK AND MOBILE DEVICE ADAPTED THERETO

(71) Applicant: SAMSUNG ELECTRONICS CO., LTD., Suwon-si (KR)

(72) Inventors: Shinjun Lee, Yongin-si (KR); Sanghyup Lee, Suwon-si (KR); Amir Dror, Tel Aviv (IL); Kyungsoo Hong, Netanya (IL); Ofir Engolz, Kfar Saba (IL); Jaehwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 13/782,392

(22) Filed: Mar. 1, 2013

(65) Prior Publication Data

US 2013/0229371 A1 Sep. 5, 2013

(30) Foreign Application Priority Data

Mar. 2, 2012 (KR) ........................ 10-2012-0021923

(51) Int. Cl.
*G06F 3/041* (2006.01)
*G06F 3/0483* (2013.01)
*G06F 3/0488* (2013.01)

(52) U.S. Cl.
CPC ............ *G06F 3/0414* (2013.01); *G06F 3/0483* (2013.01); *G06F 3/04883* (2013.01)

(58) Field of Classification Search
CPC . G06F 3/0414; G06F 3/0483; G06F 3/04883; G06F 3/04847; G06F 3/0488; G06F 3/016
USPC ......... 345/156–174, 659, 419, 473, 426, 619; 715/255, 273, 776
See application file for complete search history.

(56) References Cited

U.S. PATENT DOCUMENTS

| | | | |
|---|---|---|---|
| 2001/0024195 A1* | 9/2001 | Hayakawa | 345/173 |
| 2004/0125081 A1 | 7/2004 | Hayakawa | |
| 2005/0151742 A1* | 7/2005 | Hong et al. | 345/473 |
| 2010/0175018 A1 | 7/2010 | Petschnigg et al. | |
| 2011/0050592 A1* | 3/2011 | Kim et al. | 345/173 |
| 2011/0050594 A1 | 3/2011 | Kim et al. | |

(Continued)

FOREIGN PATENT DOCUMENTS

| | | |
|---|---|---|
| KR | 10-2010-0082903 A | 7/2010 |
| WO | 2011/094855 A1 | 8/2011 |

OTHER PUBLICATIONS

International Search Report dated Jun. 11, 2013 from the International Searching Authority in counterpart application No. PCT/KR2013/001620.

*Primary Examiner* — Alexander Eisen
*Assistant Examiner* — Abhishek Sarma
(74) *Attorney, Agent, or Firm* — Sughrue Mion, PLLC

(57) ABSTRACT

A page display method is provided that detects information related to pages of an e-book that the user inputs in a mobile device with a touch screen, and displays the pages on the touch screen, according to the detection. A system adapted to the method is also provided. The method includes: displaying a page of an e-book on the touch screen in a preset mode; detecting a touch at a spot on the displayed page; detecting a press by detecting a contact period of time of the detected touch; and, in response to at least one of a location of the spot and a strength of the detected press, displaying the spot on the page as being deformed.

21 Claims, 22 Drawing Sheets

(56) References Cited

U.S. PATENT DOCUMENTS

| | | |
|---|---|---|
| 2012/0028577 A1 | 2/2012 | Rodriguez et al. |
| 2012/0047470 A1 | 2/2012 | Martinoli |
| 2013/0016102 A1* | 1/2013 | Look et al. .................... 345/426 |
| 2013/0219321 A1* | 8/2013 | Cranfill et al. ................ 715/776 |

* cited by examiner

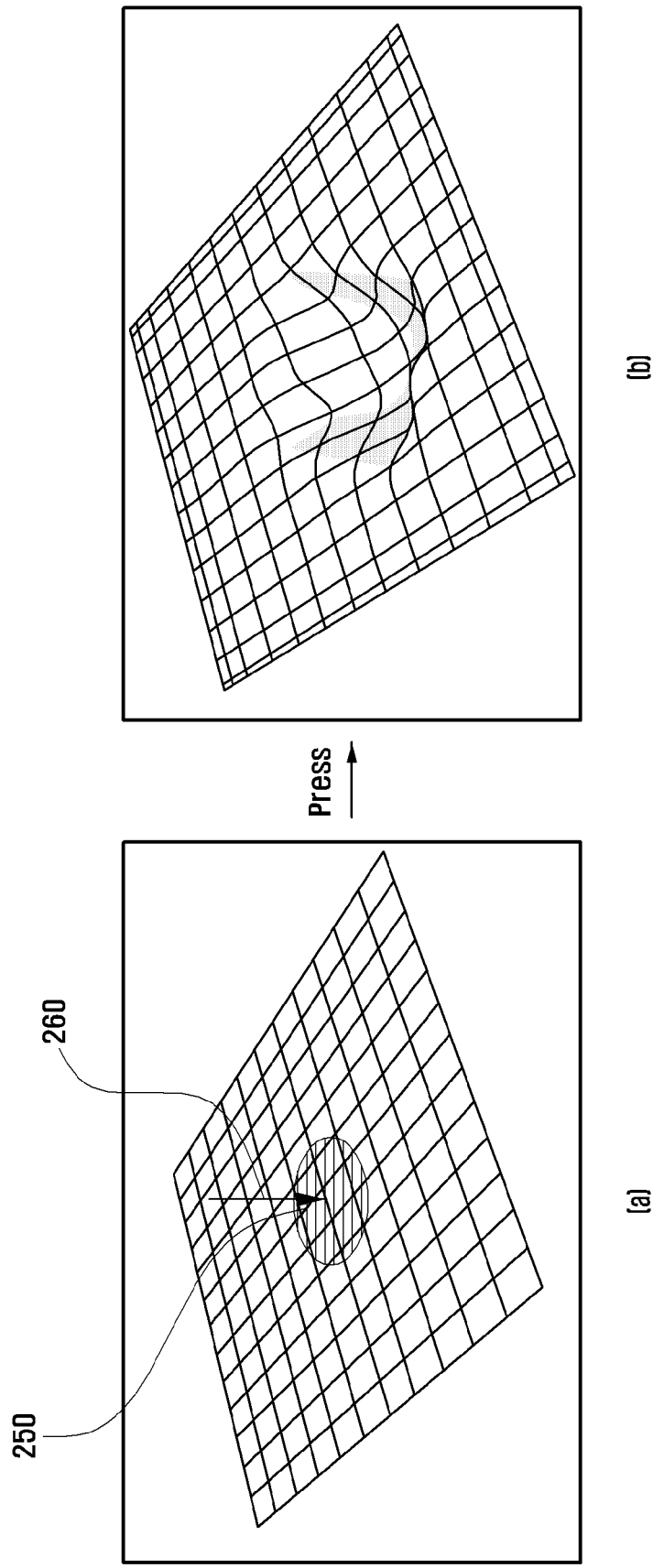

FIG. 8A
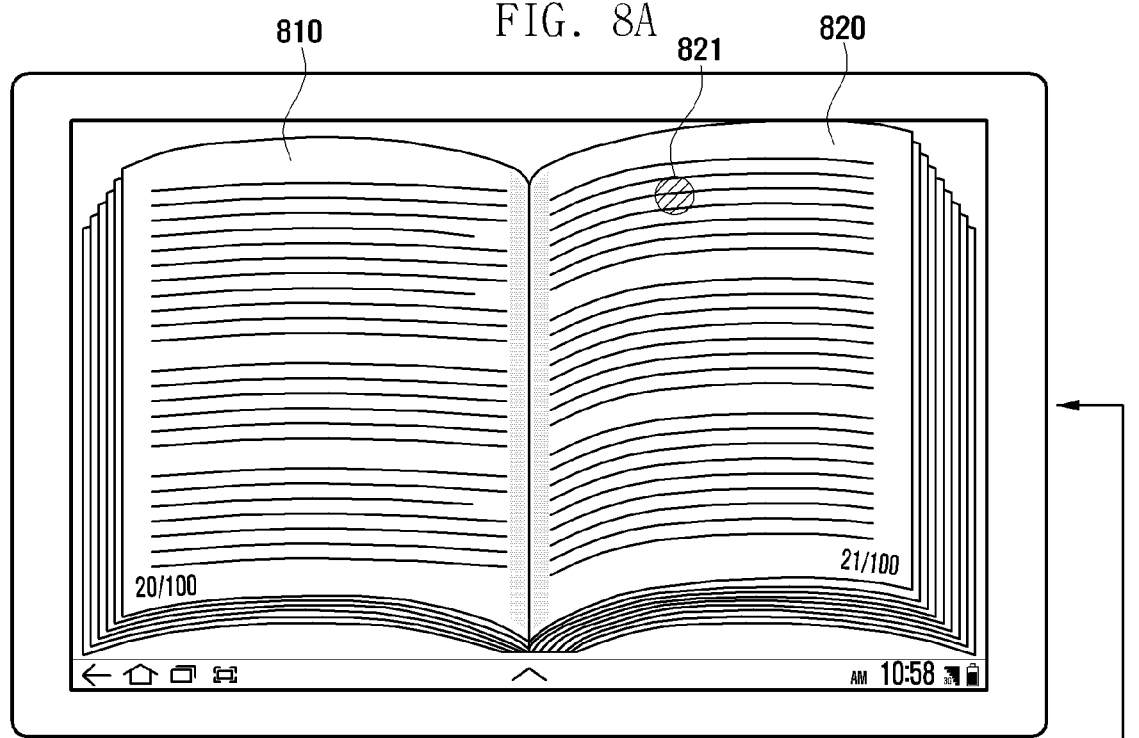
<a>
↓ Press
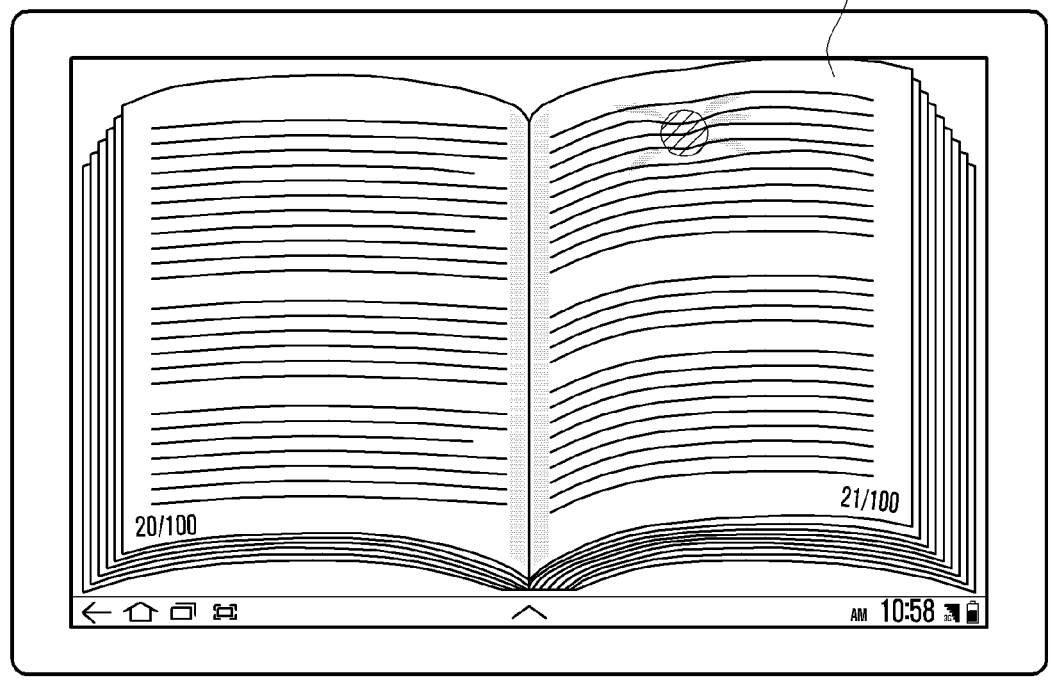
<b>
↓ More Press
Ⓐ
release
Ⓑ

FIG. 9
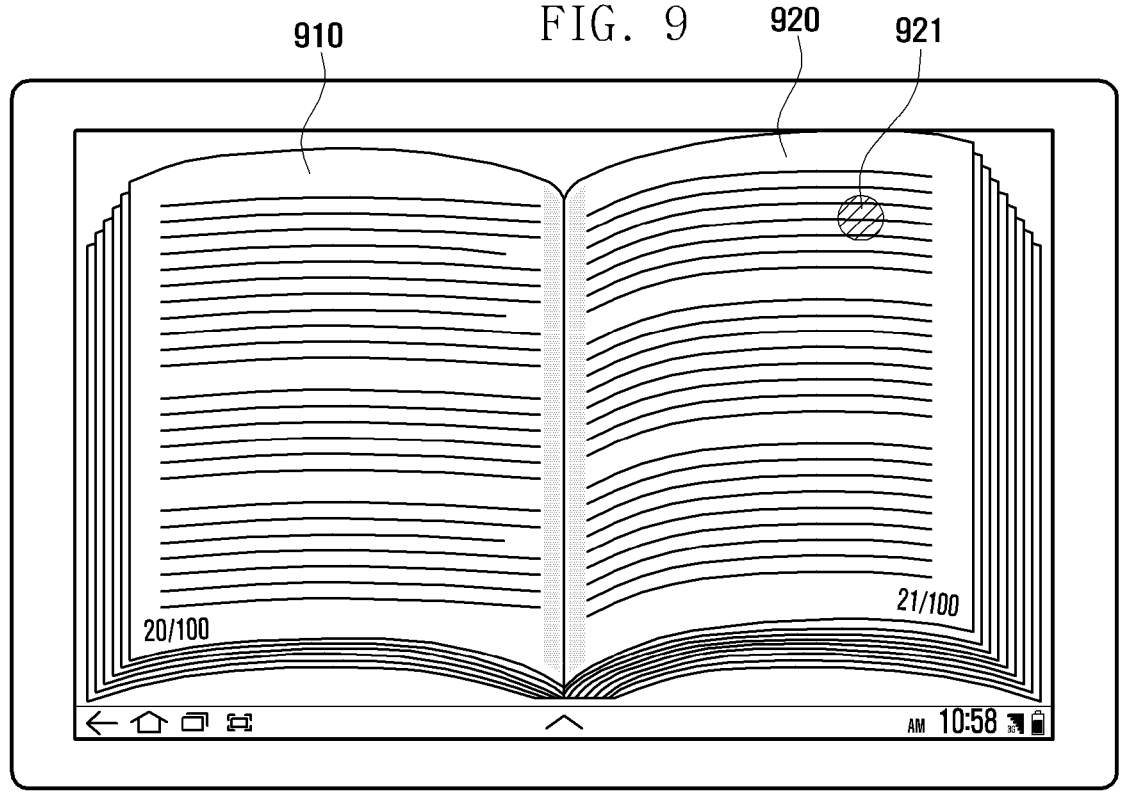
<a>
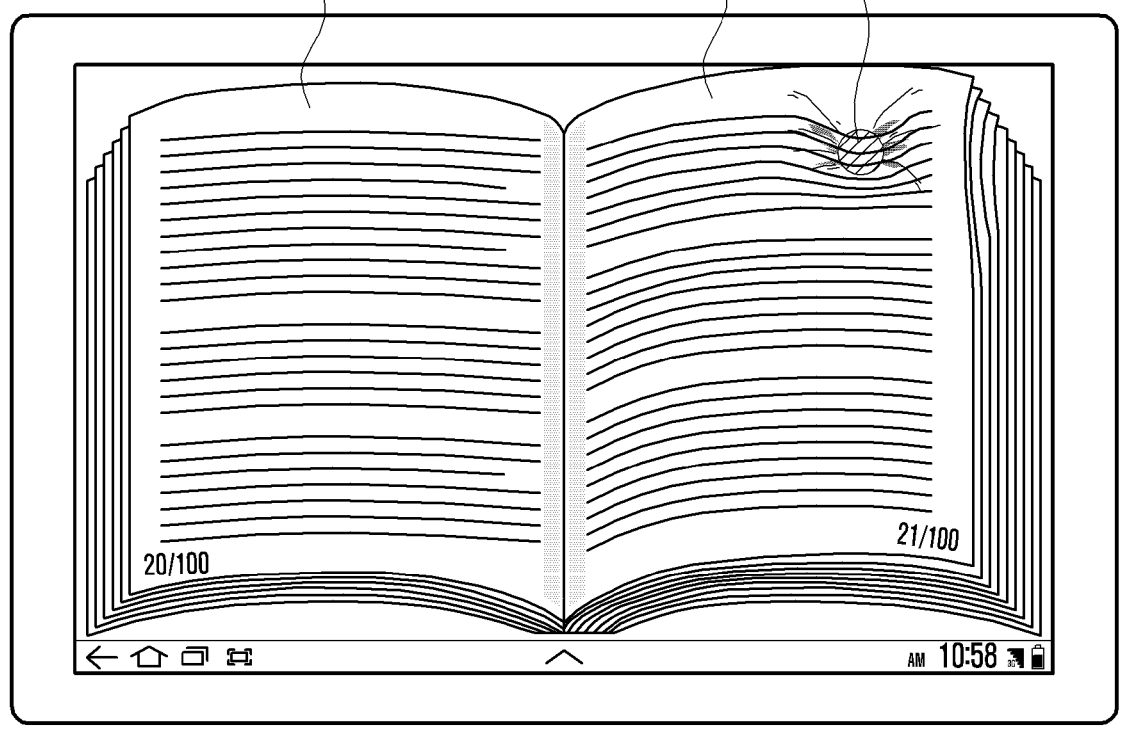
<b>

FIG. 10
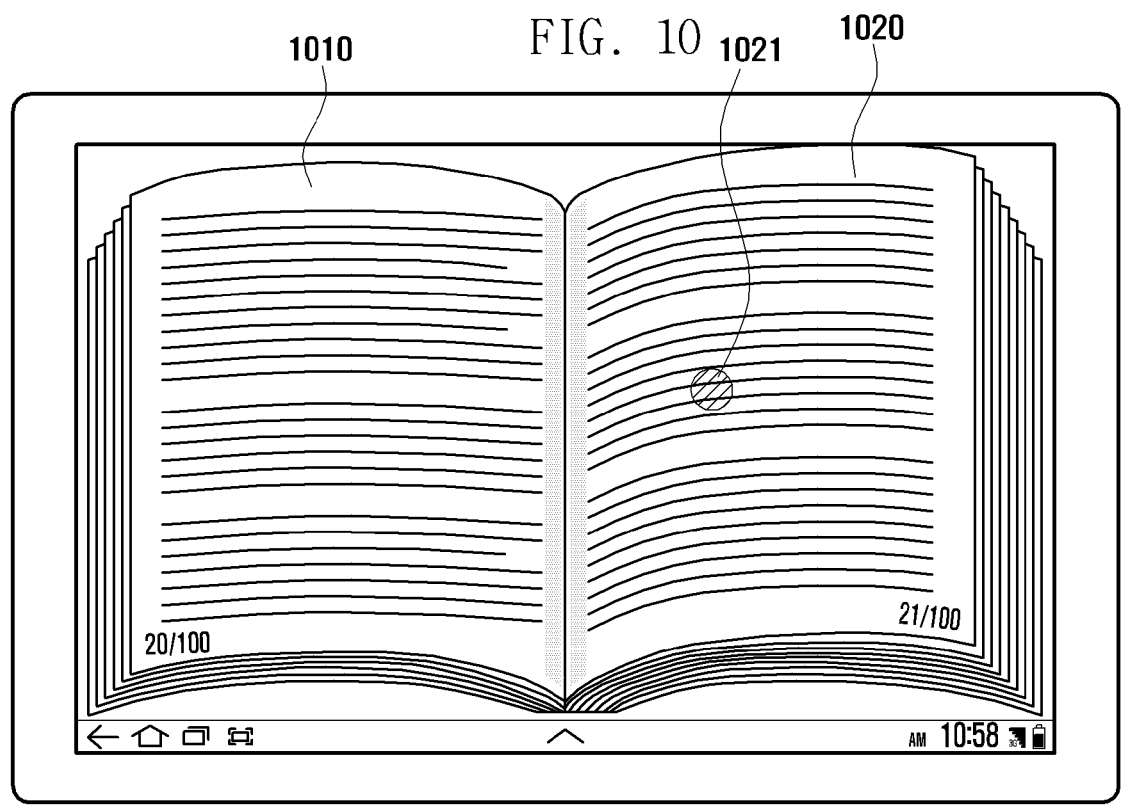
<a>
↓ Press
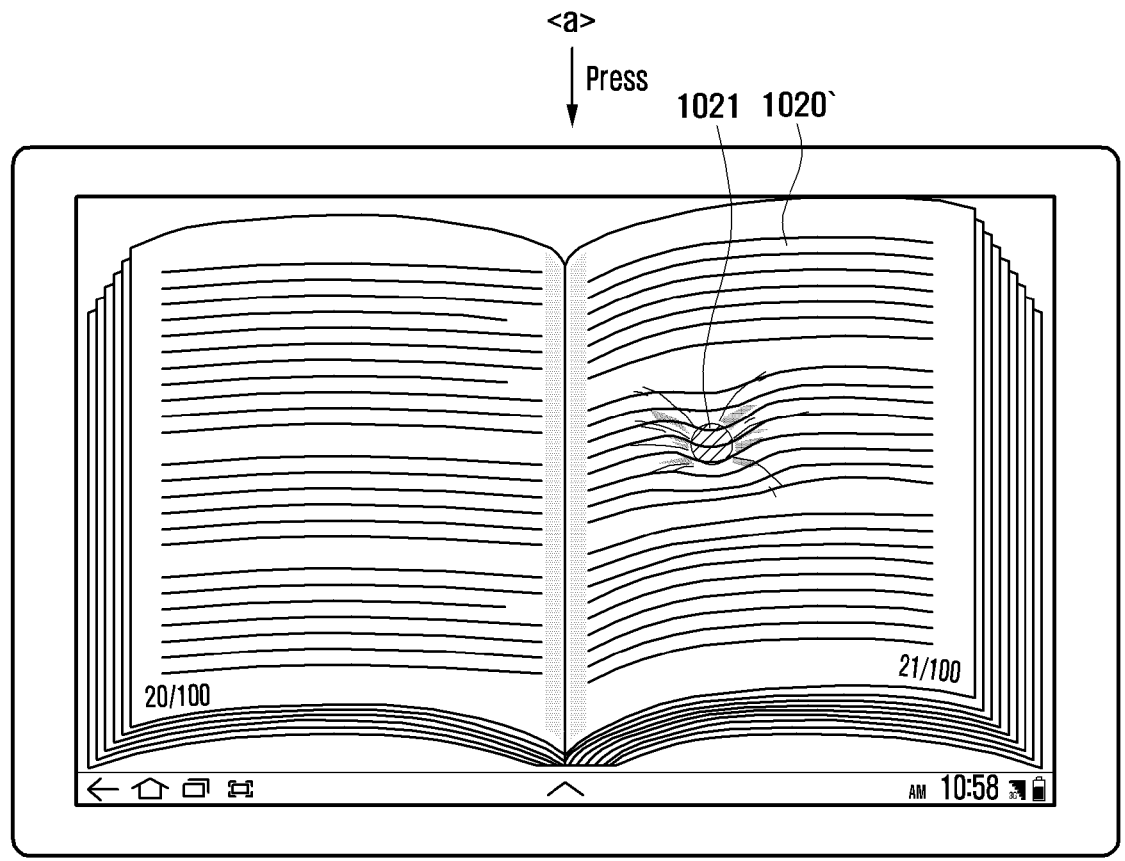
<b>

FIG. 12
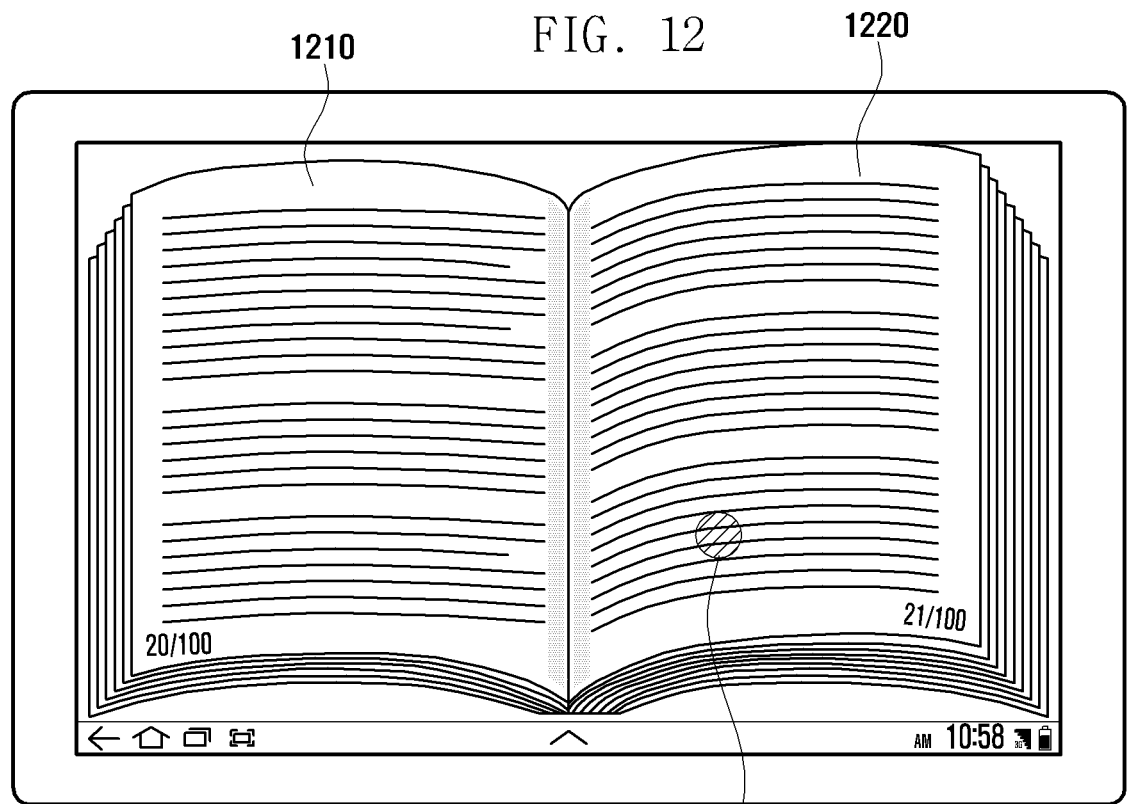
<a>
↓ Press
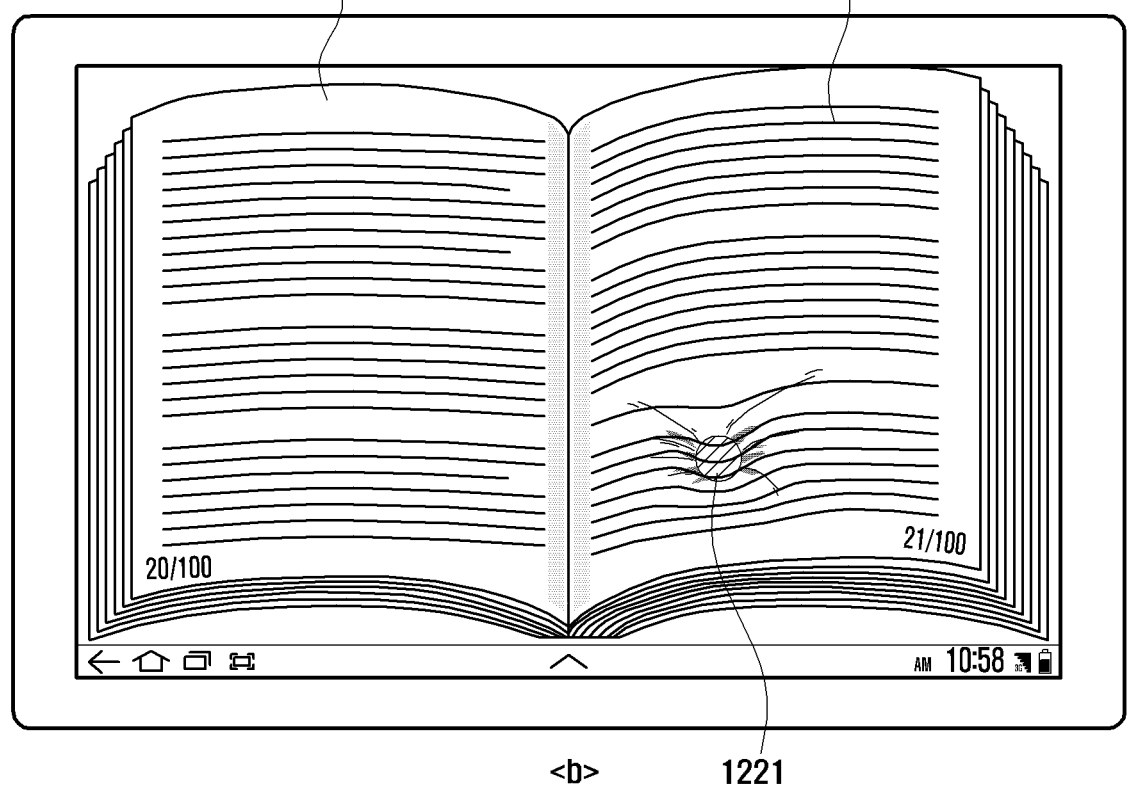
<b>

FIG. 13
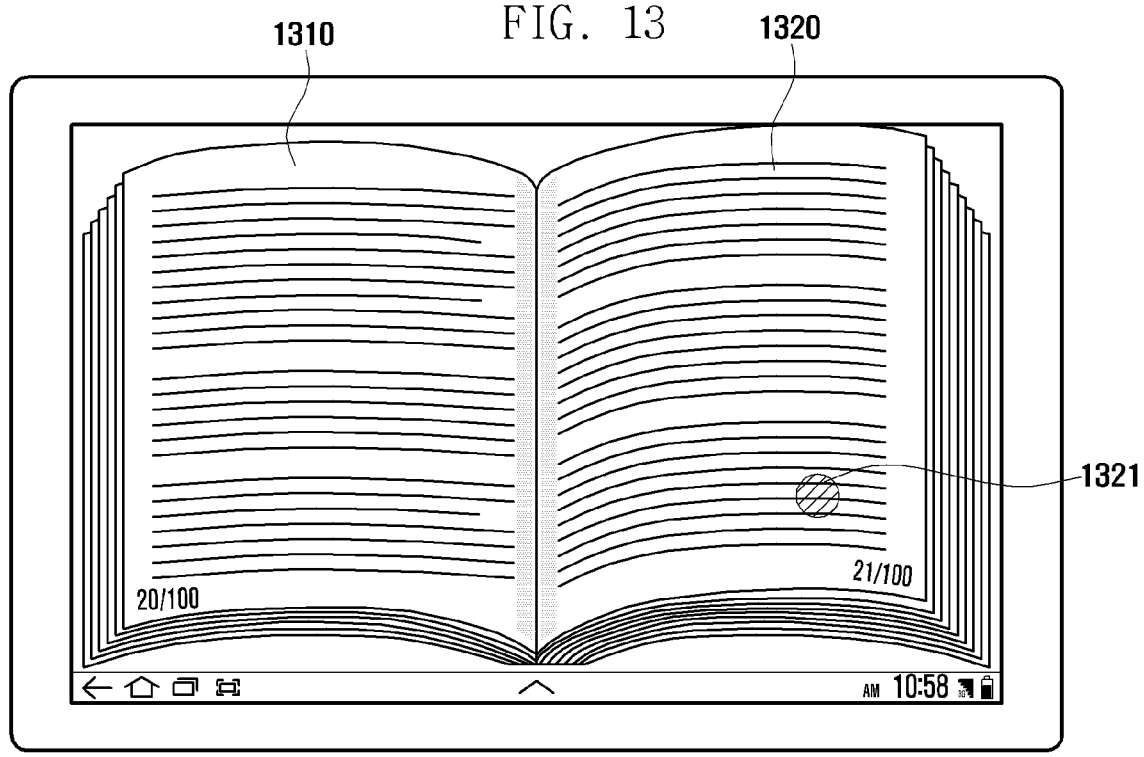
<a>
↓ Press
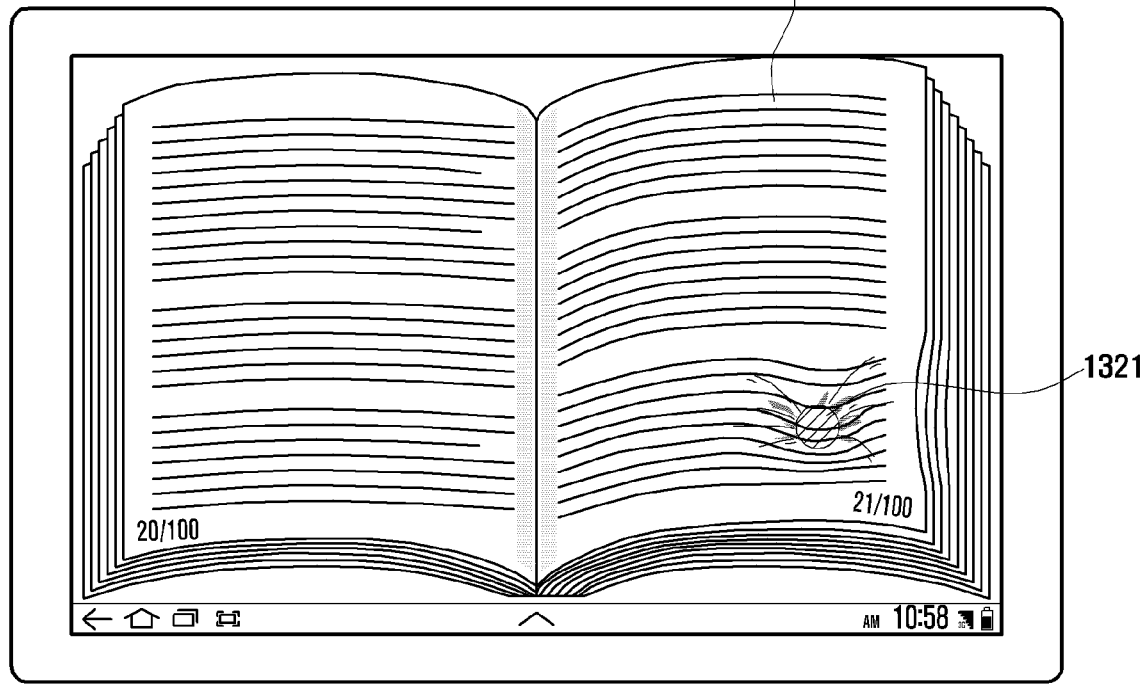
<b>

FIG. 18
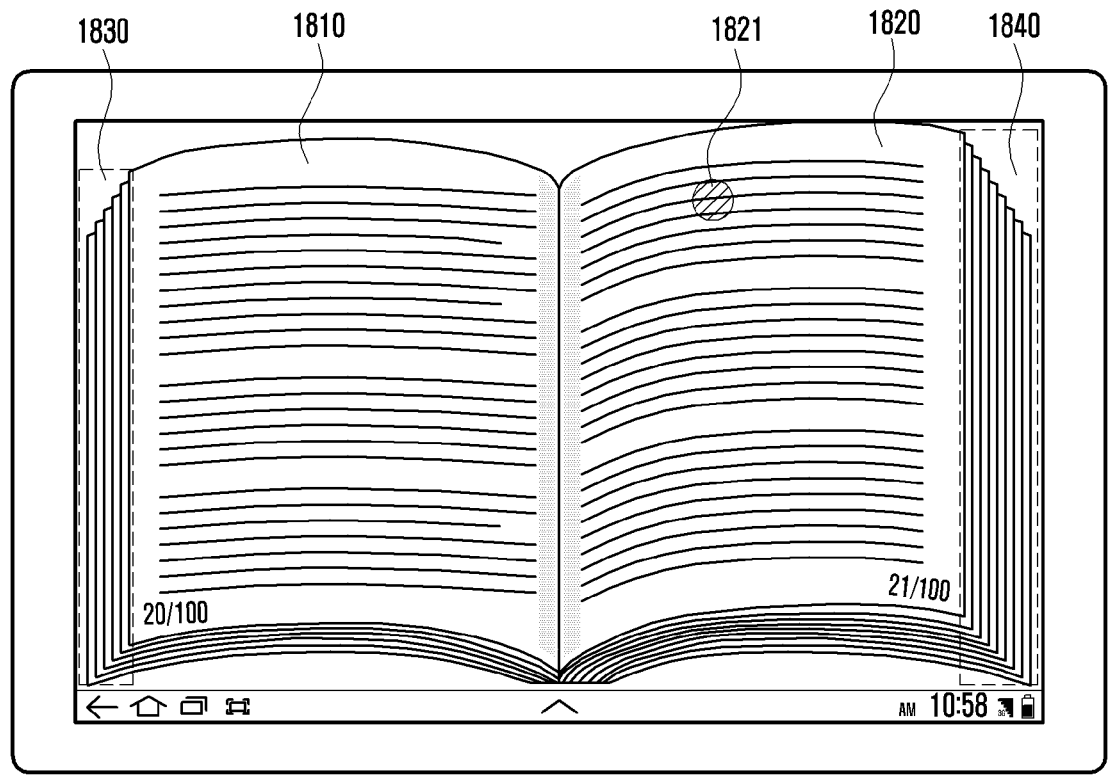
<a>
↓ 1 sec
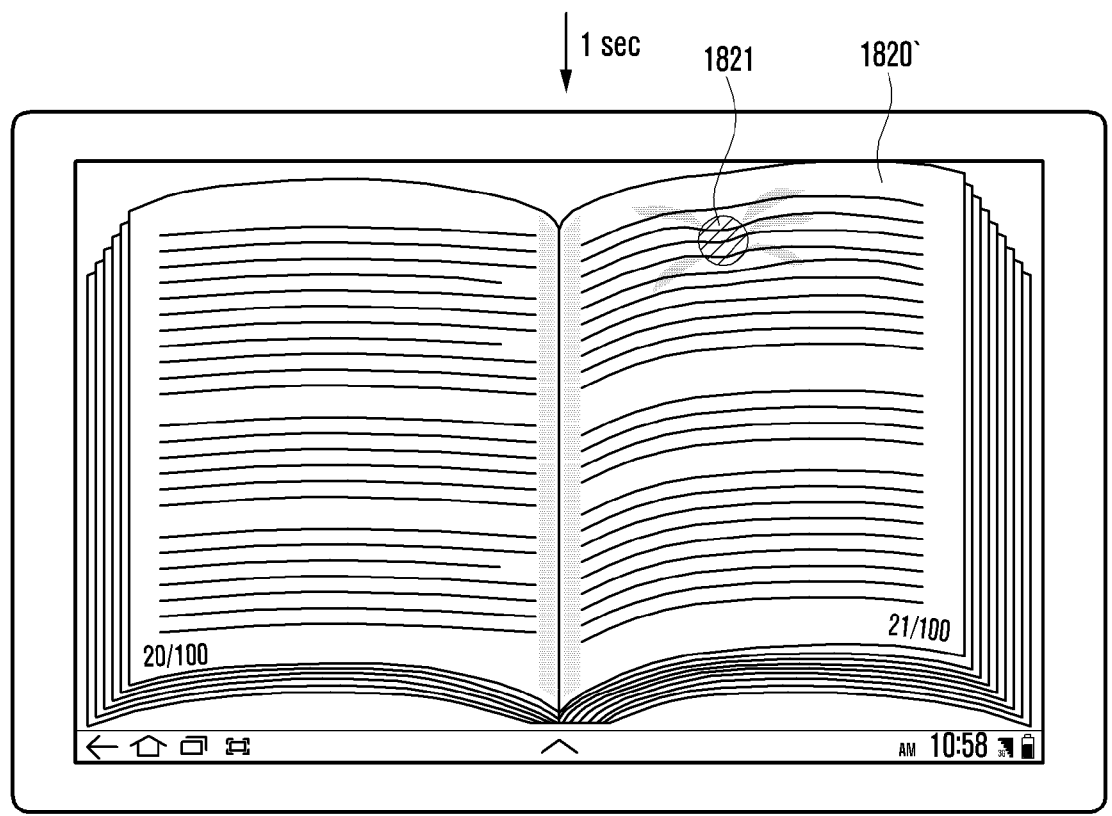
<b>

METHOD FOR DISPLAYING PAGES OF E-BOOK AND MOBILE DEVICE ADAPTED THERETO

PRIORITY

This application claims priority from Korean Patent Application No. 10-2012-0021923, filed on Mar. 2, 2012 in the Korean Intellectual Property Office, the disclosure of which is hereby incorporated by reference in its entirety.

BACKGROUND

1. Field

Exemplary embodiments relate to e-book readers. More particularly, exemplary embodiments relate to a page display method that detects a user's input information related to pages of an e-book and displays the pages according to the detected information. Exemplary embodiments also relate to a mobile device adapted to implement the page display method.

2. Description of the Related Art

In general, an electronic book (e-book) refers to a book-length publication in digital form, including texts, images, etc. that can be used in a substantially similar fashion as a printed book. Users can easily read e-books via electronic devices which have an e-book reader function, such as smart phones, tablet PCs, etc., anywhere and anytime the users want. This has led to an increase in the number of e-book users.

Mobile devices with an e-book reader function turn the pages of an e-book according to a user's input information. That is, the related art system and method for turning pages of an e-book does not provide the users with the same feeling as turning the pages of a printed book. The related art system and method for turning the pages of an e-book detects a user's input information regarding an action for turning pages of an e-book, e.g., an action of pressing a button to turn to the next page, and instantly replaces a current page with the next page. This page replacement technique is not similar to the process for turning pages of a printed book; rather it is closer to a web browsing operation.

Most mobile devices are equipped with touch screens. They can detect users' gestures during the displaying of pages of an e-book, and provide an animation of pages turning in response to a user's detected gesture. Although related art mobile devices with touch screens may provide users with the same feeling as turning the pages of a printed book, related art mobile devices still do not provide a page with an animation that operates as if a page is pressed in response to a user's gesture of turning the page.

SUMMARY OF THE EXEMPLARY EMBODIMENTS

The exemplary embodiments have been made in view of the above problems, and provide a system and method for displaying pages of an e-book that can provide users who read e-books with the same feeling as reading printed books when they are reading e-books.

The exemplary embodiments further provide a system and method for displaying pages of an e-book that can provide a page of an e-book with an animation that operates as if the page is pressed in response to a user's gesture of turning the page.

In accordance with an aspect of an exemplary embodiment, there is provided a page display method of a mobile device with a touch screen, including: displaying a page of an e-book on a touch screen in a preset mode; detecting a touch at a spot on the displayed page; detecting a press by detecting a contact period of time of the detected touch; and, in response to at least one of a location of the spot and/or a strength of the detected press, displaying the spot on the page as being deformed.

In accordance with an aspect of another exemplary embodiment, there is provided a mobile device including: a touch screen and a controller. The touch screen displays pages of an e-book in a preset mode. The controller detects a touch at a spot on the displayed page and a press by detecting a contact period of time of the touch. In response to at least one of a location of the spot and a strength of the detected press, the controller displays the pressed spot on the page as being deformed.

BRIEF DESCRIPTION OF THE DRAWINGS

The above and/or aspects of the exemplary embodiments will become more apparent from the following detailed description viewed in conjunction with the accompanying drawings, in which:

FIGS. 2A to 2C illustrate page meshes according to an exemplary embodiment;

FIGS. 8A to 8B to FIG. 13 illustrate screens that describe a first exemplary embodiment of a page display method;

FIGS. 16A and 16B to FIG. 19 illustrate screens that describe a third exemplary embodiment of a page display method.

DETAILED DESCRIPTION OF EXEMPLARY EMBODIMENTS

Figure 1:
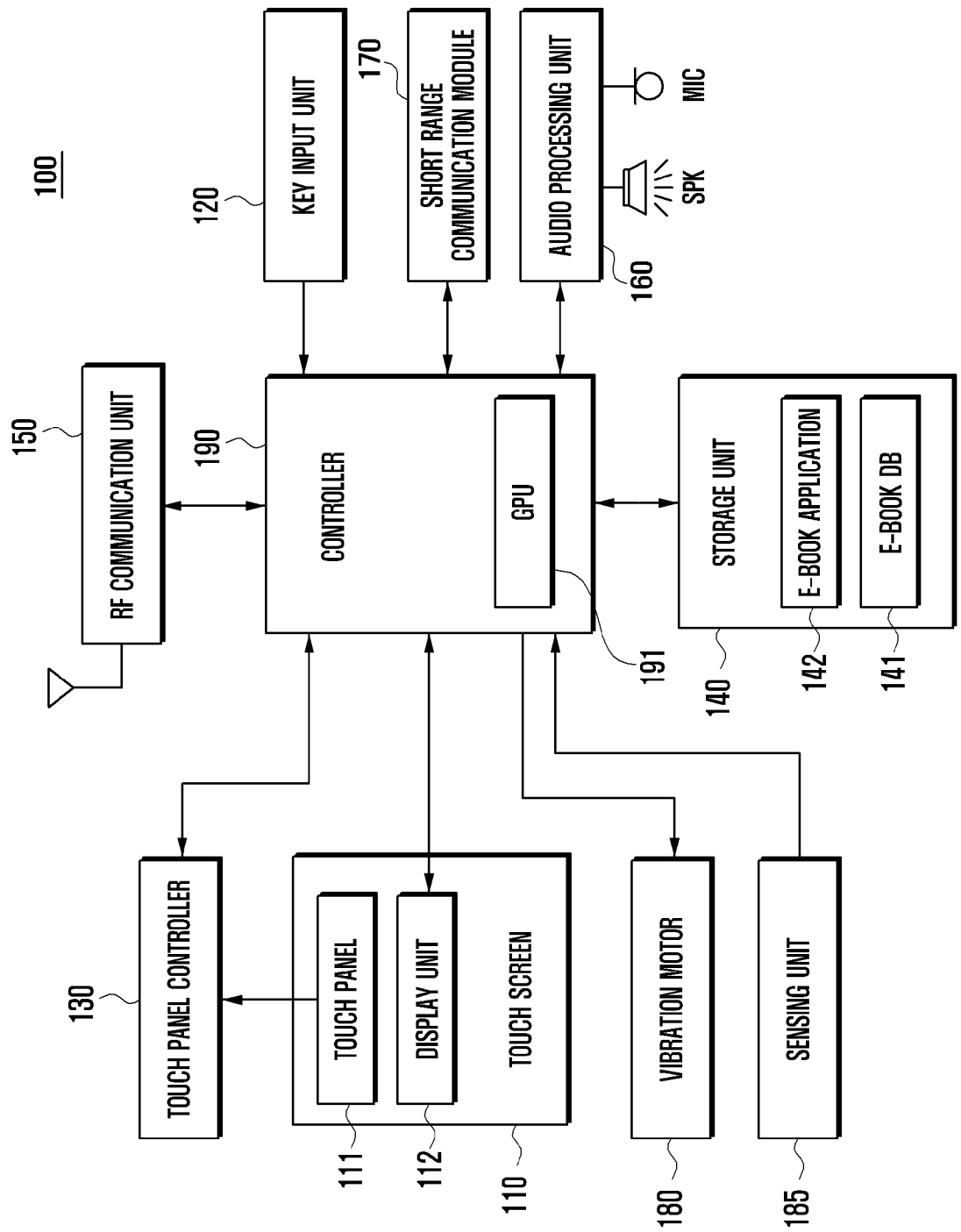
FIG. 1 illustrates a schematic block diagram showing a configuration of a mobile device according to an exemplary embodiment.

Hereinafter, exemplary embodiments are described in detail with reference to the accompanying drawings. The terms or words described in the present description and the claims should not be limited to any particular general or lexical meaning, and instead should be analyzed according to a meaning and a concept through which the inventors define and describe the exemplary embodiments. Therefore, one skilled in the art will understand that the exemplary embodiments disclosed in the description and configurations illustrated in the drawings are exemplary only, and that various modifications, alterations, and equivalents thereof may be made to replace the exemplary embodiments. Although the drawings represent exemplary embodiments, the drawings are not necessarily to scale and certain features may be exaggerated or omitted in order to better illustrate and explain the exemplary embodiments.

In the following description, the term 'bookcase' is defined as an empty area/space for storing reading items. The bookcase may be displayed in a variety of forms, e.g., folders, shelves, etc. Examples of the reading items are electronic books (e-books), a folder shaped as an image binding a number of e-books, a reading schedule for e-books planned to be read, accessories for decorating a bookcase, etc.

E-books may be classified, according to fields, into various types of publications, such as, for example, books, textbooks, magazines, newspapers, comics, specialty publications, etc. Each field may be further sub-divided. For example, books may be classified into novels, essays, poems, etc. An e-book may contain various types of content, such as, for example, text, images, audio, video, user's input information, etc. The user's input information refers to information that the user has input or inputs in a corresponding page of an e-book, e.g., memos, highlights, images, bookmarks, etc. The user may input information to the mobile device in a handwriting mode via touch input objects (e.g., fingers, stylus pen, etc.).

The term 'animation' refers to a function of a mobile device for making content, for example, a page of an e-book, move. In particular, an animation shows the motion of an e-book that operates as if the page is pressed in response to a user's input information (e.g., touch gesture, etc.).

The term 'page mesh' is defined as geometrical information regarding a page of an e-book. A page mesh includes a number of nodes and links connecting the nodes to each other. The nodes are allocated with masses respectively. The links are also allocated with coefficients of elasticity respectively. Coefficients of elasticity may be set to transfer actual feelings according to the characteristics of paper to users. For example, if a sheet of an e-book is set as thick (i.e., the sheet has a large mass), the sheet may be allocated with a large coefficient of elasticity. On the contrary, if a sheet of an e-book is set as thin, the sheet may be allocated with a small coefficient of elasticity. Likewise, the nodes located at the inner parts of the pages (e.g., the gutter or spine) may be allocated with relatively large masses. Further, the nodes located at the outer parts of the pages (e.g., the edges) have a larger change in position than at the inner parts, and may thus be allocated with relatively small masses. It should be understood that all nodes may be allocated with the same mass.

Each node may be subjected to two types of virtual forces. One virtual force is a virtual inner force such as elastic force. The other virtual force is a virtual external force such as virtual gravity or virtual human power. Virtual gravity attracts nodes to the ground in a downward direction. The display screen displaying a page of an e-book may be defined, in terms of direction, in such a way that: the X-Y plane is parallel to the screen surface; the positive Z-axis is perpendicular to the X-Y plane, or located at the user's viewpoint; and the negative Z-axis is thus opposite to the positive Z-axis. The Z-axis is a virtual axis perpendicular to the X-Y plane, not an actual axis. Virtual gravity is applied to all nodes. However, virtual gravity may be applied to corresponding nodes of virtual pages with different values according to the characteristics of paper, thereby transferring the same feeling as the actual paper to users. For example, when a user turns over a sheet of an actual paper book, the corresponding virtual sheet may slowly fall if the sheet is thin/light, but may fall in a fast fashion if the sheet is thick/heavy. The following table 1 shows surface densities according to types of paper.

TABLE 1

| Paper type | Weight |
| --- | --- |
| Leaflet inserted between the pages of newspaper | 52.3 g/m$^2$ |
| Magazine body paper, advertising bill | 64 g/m$^2$ |
| Ticket, weekly cover, pamphlet | 127.9 g/m$^2$ |
| Fashion magazine cover, business card | 157 g/m$^2$ |
| Sketchbook | 200 g/m$^2$ |
| Printed paper | 75 g/m$^2$ |

According to the surface densities of table 1, for example, a pamphlet falls faster than a leaflet.

Virtual human power corresponds to a user's force applied to a virtual sheet of an e-book when the user turns over the virtual sheet, based on a user gesture (e.g., a touch gesture) applied to a touch screen. An example of the touch gesture is a flick action, a drag action, a press action, or the like. The touch gesture is defined by a vector that is a quantity specified by a magnitude and a direction. When a user applies virtual force to a node, the node moves in the direction of the virtual force. In this case, the other nodes are also subjected to the user applying virtual force to the node since the nodes are connected to each other via links.

Therefore, the nodes in the page mesh are subjected to the net virtual forces acquired by computing the vector sum of the inner virtual forces and the external virtual forces, respectively. If a user applies force to a page displayed on the screen of the mobile device (e.g., mobile smart phone), the controller computes virtual forces acting on the respective nodes of a page mesh based on the user's applied force (e.g., human touch movement speed and direction), and deforms the page mesh based on the computed virtual forces acting on the respective nodes. The user's applied force can be computed in such a way that an acceleration value is first acquired via the distance running on the nodes and the velocity of the user's touch gesture, and then is multiplied by the mass of a corresponding node. Since the computations of force, acceleration, and velocity are well known, a detailed description thereof is omitted in the following description. After computing these values, the mobile device reflects the deformed page mesh to the page and creates the animation. The creation of an animation based on the user's applied force may be executed via an Application Processor (AP), a Central Processing Unit (CPU), a Graphics Processing Unit (GPU), or the like.

The page display system and method according to exemplary embodiments may be applied to various types of electronic devices with an e-book reader function and touch screens. In particular, the page display system and method according to exemplary embodiments can be applied to mobile devices. Examples of mobile devices include mobile phones, smart phones, table PCs, hand-held PCs, Portable Multimedia Players (PMPs), e-book readers, Personal Digital Assistants (PDAs), etc. In the following description, it is assumed, for illustrative purposes only, that the page display system and method is applied to mobile devices with touch screens.

Exemplary embodiments of the page display system and method are described in detail with reference to the accompanying drawings. Detailed descriptions of well-known functions and structures incorporated herein may be omitted to avoid obscuring the subject matter of the exemplary embodiments.

FIG. 1 illustrates a schematic block diagram showing a configuration of a mobile device according to an exemplary embodiment.

Referring to FIG. 1, the mobile device 100 includes a touch screen 110, a key input unit 120, a touch panel controller 130, a storage unit 140, an RF communication unit 150, an audio processing unit 160, a speaker (SPK), a microphone (MIC), a short-range communication module 170, a vibration motor 180, a sensing unit 185 and a controller 190.

The touch screen 110 includes a touch panel 111 and a display unit 112.

The touch panel 111 may be placed on the display unit 112. The touch panel 111 creates signals according to the user's touch events and transfers them to the controller 190. The touch panel 111 may be implemented with an add-on type of touch panel placed on the display unit, an on-cell type or in-cell type of touch panel inserted in the display unit, or the like. The controller 190 identifies touch gestures according to the signals transferred from the touch screen 110, and controls the components in the mobile device according to the identified touch gestures. A user's actions with respect to the touch screen 110 are classified into touches and touch gestures. Examples of the touch gestures include a tap, a double tap, a long tap, a drag, a drag and drop, a flick, a press, etc. 'Touch' refers to a gesture that contacts one point on the touch screen by using objects (e.g., fingers, stylus pen, etc.). 'Tap' refers to a gesture that strikes gently on one point on the touch screen via objects (e.g., fingers, stylus pen, etc.), i.e., a touch and touch-off gesture or a drop gesture. 'Double tap' refers to a gesture that successively strikes one point on the touch screen twice, gently, by using objects (e.g., fingers, stylus pen, etc.). 'Long tap' refers to a gesture that contacts one point on the touch screen for longer than the 'tap' gesture and then stops the contact. 'Drag' refers to a gesture that touches one point on the touch screen and then moves to another location without stopping the touch of the touch screen. 'Drag and drop' refers to a gesture in which a drag gesture is performed and then the touching of the touch screen is stopped (touch off). 'Flick' refers to a gesture that brushes the touch screen lightly or moves faster than the 'drag' gesture on the touch screen by using objects (e.g., fingers, stylus pen, etc.) and then releases the touch therefrom. 'Press' refers to a gesture that contacts and presses one point on the touch screen by using objects (e.g., fingers, stylus pen, etc.). That is, 'touch' refers to a state where an object (finger or stylus pen, etc.) is contacting the touch screen, and 'touch gesture' refers to a successive motion on the touch screen from a touch-on gesture until a touch-off gesture. The touch panel 111 includes pressure sensors. The touch panel 111 detects pressure on a touched point and transfers a signal corresponding to the detected pressure to the controller 190. The controller 190 distinguishes between a touch and a press via the detected pressure.

The touch panel 111 may be implemented with various types of panels, such as a resistive type, a capacitive type, an electromagnetic induction type, etc.

The display unit 112 converts video data from the controller 190 into analog data or digital data and displays the data, under the control of the controller 190. The display unit 112 displays a variety of screens according to the operations of the mobile device, e.g., a lock screen, a home screen, an application execution screen, menu screens, a keypad screen, a message writing screen, an Internet screen, etc. A lock screen refers to a screen with a lock pattern, which is displayed, for example, when the display unit 112 is turned on. In this case, when a touch event for unlocking the lock occurs on the lock screen, the controller 190 controls the display unit 112 to display a home screen or an application execution screen. A home screen refers to a screen showing a number of icons corresponding to application programs. When the user selects an icon corresponding to an application program, e.g., an e-book application, the controller 190 executes the application program and controls the display unit 112 to display the application execution screen.

The display unit 112 displays animation images under the control of the controller 190, e.g., an animation that operates as if a printed page is turned over or a printed page is pressed. The animations of pages turning may be displayed differently depending on the thickness of a sheet, a location where a touch is made on the page, the movement distance of a touch gesture, the movement direction of a touch gesture, the speed of a touch gesture, etc. In addition, the animations of pages being pressed may be displayed differently depending on the pressed locations on a page, the pressing strength, the number of remaining pages under the pressed page, etc.

The display unit 112 may be implemented as a flat display panel, such as a Liquid Crystal Display (LCD), Organic Light Emitting Diodes (OLEDs), Active Matrix Organic Light Emitting Diodes (AMOLEDs), or the like.

The key input unit 120 includes a number of input keys and function keys that receive numbers and letters and set a variety of functions in the mobile device. The function keys include direction keys, side keys, shortcut keys, etc., which are set to perform specific functions. The key input unit 120 creates key signals, which are related to a user's settings and function controls of the mobile device 100, and transfers the key signals to the controller 190. Examples of the key signals include a signal for turning on/off the mobile device 100, a signal for adjusting the volume, a signal for turning on/off the screen, etc. The controller 190 controls corresponding components according to the key signals. The key input unit 120 may be implemented with a QWERTY keypad, a 3×4 keypad, a 4×3 keypad, etc., which includes a number of keys. In particular, if the mobile device 100 is designed to include a full touch screen, the key input unit 120 may be implemented with one or more side keys for turning on/off the screen or the mobile device 100, which are installed to the side of the case of the mobile device 100.

The touch panel controller 130 receives signals corresponding to touch events from the touch panel 111, performs analog-digital (AD) conversion to convert the received signal to digital signals, and transfers the digital signals to the controller 190. The controller 190 detects touch gestures via the signal from the touch panel controller 130. That is, the controller detects a location where a touch is made on the page, the movement distance of a touch gesture, the movement direction of a touch gesture, the speed of a touch gesture, the pressure of a touch, etc.

The storage unit 140 stores an operating system (OS) of the mobile device and application programs according to the exemplary embodiments. The storage unit 140 also stores data. The storage unit 140 includes a program storage area and a data storage area.

The data storage area stores data that is created when the mobile device 100 is used or data that is downloaded from the external system, e.g., e-books, contacts, images, document files, videos, messages, emails, music files, audio data corresponding to sound effects, etc. The data storage area also stores screen data to be displayed via the display unit 112. For example, a menu screen may include a key for altering screens (e.g., a return key for returning to the previous screen, etc.), a key for controlling a currently executed application, etc. The data storage area temporarily stores data via a copying and pasting command, e.g., data copied from messages, photographs, web pages, documents, etc. The data storage area also stores values for setting the functions of the mobile device, e.g., the level of screen brightness, a determination as to whether to operate a vibration when a touch is generated, a determination as to whether the screen is automatically rotated, etc. In an exemplary embodiment, the data storage area stores a database 141 with a number of e-books. The data storage area also stores reading state information regarding the respective e-books. Reading state information includes, for example, the dates on which e-books are stored, the number of e-books which have been read, the pages which have been read, the dates on which pages have been read, the pages left to be read, the user's input information, etc. The user's input information may be displayed on a page when the page is displayed (opened).

The program storage area stores an operating system (OS) for booting and controlling the entire operation of the mobile device, and a number of application programs. The program storage area stores a web browser for accessing the Internet, an MP3 player application for playing back audio files, a camera application for taking photographs and videos and displaying and storing the photographs and videos, etc. The program storage area stores an e-book application 142 for displaying e-books stored in the e-book DB 141.

The RF communication unit 150 performs a voice/video call, data communication, etc., under the control of the controller 190. To this end, the RF communication unit 150 includes an RF transmitter for up-converting the frequency of signals to be transmitted and amplifying the signals and an RF receiver for low-noise amplifying received RF signals and down-converting the frequency of the received RF signals. The RF communication unit 150 includes a mobile communication module (e.g., a 3rd-Generation (3G) mobile communication module, 3.5G, 4G, etc.), a digital broadcasting module (e.g., a DMB module), etc.

The audio processing unit 160 transfers audio signals, output from the controller 190, to a speaker (SPK). The audio processing unit 160 also transfers audio signals, such as voices, input via a microphone (MIC), to the controller 190. The audio processing unit 160 converts voice/audio data into audible signals and then outputs the audible signals via a speaker, according to the control of the controller 190. The audio processing unit 160 also converts audio signals such as voices, received via a microphone, into digital signals and then transfers the digital signals to the controller 190. In particular, the audio processing unit 160 outputs a sound effect of a page flipping via the speaker under the control of the controller 190. The page-flipping sound effects may differ from each other, according to the thickness of a sheet, a location where a touch is made on the page, the movement distance of a touch gesture, the movement direction of a touch gesture, the speed of a touch gesture, etc. The audio processing unit 160 also outputs a sound effect of a page being pressed, via the speaker. The page pressing sound effects may differ from each other according to a location where a press is made on the page, the intensity of a press, the duration of a press, the number of remaining pages under a pressed page, etc.

The short-range communication module 170 allows the mobile device 100 to communicate with external systems in wired or wireless mode. The short-range communication module 170 may be implemented with a module according to Zigbee, Wi-Fi, Bluetooth, or the like. In particular, the short-range communication module 170 receives e-books from external systems and transfers the e-books to the storage unit 150 under the control of the controller 190.

The vibration motor 180 is operated under the control of the controller 190. The vibration motor 180 provides haptic feedback. That is, the controller 190 operates the vibration motor 180 to provide one or more items of feedback corresponding to page turning according to the movement of a user's touch gesture. The feedback by the vibration motor 180 may differ according to the material of a sheet, the thickness of a sheet, etc.

The sensing unit 185 detects signals related to changes in tilt, illumination, and acceleration of the mobile device 100, and transfers the signals to the controller 190. The sensing unit 185 detects changes in the state of the mobile device 100, creates the signals, and transfers the signals to the controller 190. The sensing unit 185 may include various types of sensors. According to exemplary embodiments, the controller 190 supplies one or more sensors with electric power when the mobile device 100 is turned on (or according to the user's settings), and detects the change in states of the mobile device 100 via the operated sensors. According to an exemplary embodiment, the sensing unit 185 is always enabled to detect the changes in states, or tilt, of the mobile device 100. Alternatively, the sensing unit 185 may be enabled according to a user's setting or a user's request.

The sensing unit 185 may be implemented with one or more sensing devices which can detect the change in states of the mobile device 100. Examples of the sensing devices are an acceleration sensor, a gyro sensor, a luminance sensor, a proximity sensor, a pressure sensor, a noise sensor (e.g., a microphone), a video sensor (e.g., a camera module), a timer, etc. The sensing unit 185 may be implemented as one chip where a number of sensors are integrated. Alternatively, the sensing unit 185 may be implemented as a number of sensors that are formed as a plurality of chips. For example, the controller 190 can detect the current state of the mobile device 100, via information regarding the tilt detected by a motion sensor (e.g., values detected with respect to X-, Y-, and Z-axes).

Figure 19:
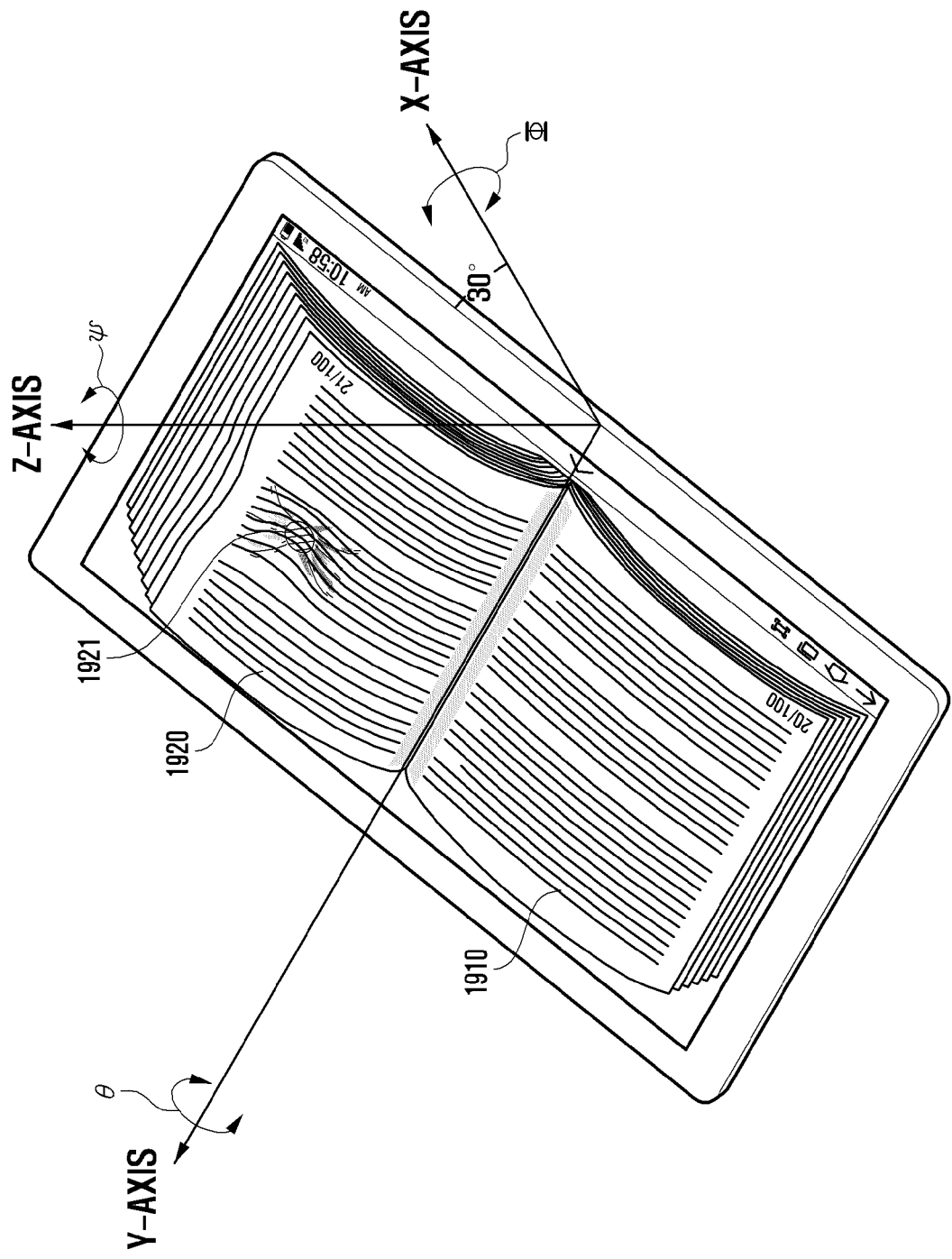

The sensing unit 185 measures the acceleration of the mobile device 100, creates an electrical signal based on the measured acceleration, and transfers the electrical signal to the controller 190. For example, if the sensing unit 185 is a three-axis acceleration sensor, the sensing unit 185 can measure the acceleration of gravity with respect to X-, Y- and Z-axes as shown in FIG. 19. The sensing unit 185 can measure a net acceleration from the vector sum of the acceleration of motion of the mobile device 100 and the acceleration of gravity. If the mobile device 100 does not move, the sensing unit 185 can measure only the acceleration of gravity. According to an exemplary embodiment, it is assumed that the direction of the acceleration of gravity is positive if the front side of the mobile device 100 faces upward and negative if the back side faces upward. As shown in FIG. 19, if the mobile device 100 is placed on a horizontal surface of an object so that the back side faces the surface, the sensing unit 185 measures the acceleration of gravity as 0 m/sec$^2$ with respect to X- and Y-axis components and a positive value (e.g., 9.8 m/sec$^2$) with respect to a Z-axis component. On the contrary, if the mobile device 100 is placed on a horizontal surface of an object so that the front side faces the surface, the sensing unit 185 measures the acceleration of gravity as 0 m/sec$^2$ with respect to X- and Y-axis components and a negative value (e.g., −9.8 m/sec$^2$) with respect to a Z-axis component.

If the mobile device 100 is tilted when the user holds the mobile device 100 with his/her hand, the sensing unit 185 can measure the acceleration of gravity where one or more of the X- or Y-axis components are not 0 m/sec$^2$. In this case, the square root of the sum of the squares of the three axis components, i.e., the magnitude of the vector sum of the three axis components, may be a certain value (e.g., 9.8 m/sec$^2$). The sensing unit 185 also detects accelerations with respect to X-, Y-, and Z-axis directions. It should be understood that the axes and the accelerations of gravity corresponding to the axes may differ from each other, respectively, according to the locations where the sensing unit 185 is attached.

The controller 190 controls the entire operation of the mobile device 100 and the signals flowing among the components therein. The controller 190 processes data. The controller 190 also controls the electric power supplied to the components from the battery. The controller 190 executes the application programs stored in the program storage area. The controller 190 executes an animation of pages turning in response to a touch gesture (e.g., a drag, a flick, etc.). The controller 190 deforms a page in response to a touch gesture or information regarding how much the mobile device is tilted. To this end, the controller 190 includes a Graphics Processing Unit (GPU) 191.

The GPU 191 deforms a page mesh in response to a touch gesture and creates an animation of the page based on the deformed page mesh. The GPU 191 receives information regarding a touch gesture from the touch panel controller 130 and deforms a page mesh based on the received information. If the user applies a user gesture (e.g., touch input) to a page, the GPU 191 deforms a page mesh according to the user gesture. If the user's applied gesture is removed (e.g., if the user stops touching the touch screen 110 by removing his/her finger after performing a drag or press action), the GPU 191 restores the deformed page mesh to the original one. That is, the deformed page mesh is restored to the original state based on the elastic characteristics of the links and the forces of gravity applied to the respective nodes. The GPU 191 receives pages from the storage unit 140. The GPU 191 reflects information regarding deformation of a page mesh to a page transmitted from the storage unit 140, and creates the animation. The information regarding deformation of a page mesh includes coordinates (x, y, z) of respective nodes forming the page mesh. The GPU 191 controls the display unit 112 to display animations.

When the controller 190 measures the accelerations of gravity transferred from the sensing unit 185 via one or more axis components, the controller 190 can calculate a tilt of the mobile device 100 via the accelerations with respect to the respective axes. The acquired tilt may include a roll angle $\phi$, a pitch angle $\theta$ and a yaw angle $\psi$. As shown in FIG. 19, the roll angle $\phi$, pitch angle $\theta$ and yaw angle $\psi$ are rotational angles with respect to X-, Y- and Z-axes, respectively. Referring to FIG. 19, if the X- and Y-axis components of the acceleration of gravity transferred from the sensing unit 185 are 0 m/sec$^2$ and the Z-axis component is 9.8 m/sec$^2$, the tilt ($\phi$, $\theta$, $\psi$) of the mobile device 100 is (0, 0, 0). As such, the method according to the exemplary embodiments can calculate any tilts of the mobile device 100. The controller 190 may calculate the tilt of mobile device 100 via a variety of algorithms, e.g., a position computational algorithm using the Euler angles or an extended Kalman filter, an acceleration estimation switching algorithm, etc. The measurement of the tilt of the mobile device 100 via an accelerometer may be implemented with a variety of methods.

The GPU 191 deforms a page mesh in response to the change in tilt of the mobile device 100 and displays the page to reflect the deformed page mesh, thereby creating the animation of a page. The GPU 191 receives information regarding a tilt of the mobile device 100 from the controller 190. The GPU 191 calculates the deformation degree of a page based on the received information, and creates and displays an animation corresponding to the calculation. For example, if the mobile device 100 is tilted at a tilt (0, 0, 60), operates in a landscape mode, which is a display mode in which two pages are displayed on the screen, side by side, and has 200 pages to be turned over, as the number of remaining pages, displayed on the right part of the screen, the GPU 191 may create and display an animation of turning over 100 pages to the left part of the screen. According to exemplary embodiments, a page turning mode includes a normal mode, a gradient mode, and a merge mode. A page turning mode may be set according to a user's request. If the user sets the page turning mode to a normal mode, the GPU 191 creates an animation in response to the detected touch gesture. If the user sets the page turning mode to a gradient mode, the GPU 191 creates an animation by using a calculated tilt. Likewise, if the user sets the page turning mode to a merge mode, the GPU 191 creates an animation by using a touch gesture and a calculated tilt. The properties (e.g., thickness, weight, material, etc.) set for pages may be taken into account in deforming a page with respect to the respective modes described above. Alternatively, the properties set for pages may not be taken into account in deforming a page. Animations may be created by both or either of a GPU and an Application Processor. The AP may be a System on Chip (SoC) that integrates a CPU and a GPU into a single chip. Alternatively, the AP may be formed in such a way that a CPU and a GPU are packaged in multiple layers.

With the convergence of digital devices, there may be many digital devices and modifications thereof which are not explicitly described above, and it will be appreciated that these digital devices and modifications can also be included in or operate with the mobile device 100 according to exemplary embodiments. For example, the mobile device 100 may further include a GPS module, a camera module, etc. Also, it will be appreciated that, according to a desired purpose, the mobile device 100 may be implemented by omitting a particular element from the configuration shown in FIG. 1 or replacing a particular element with other elements.

Figure 2A:
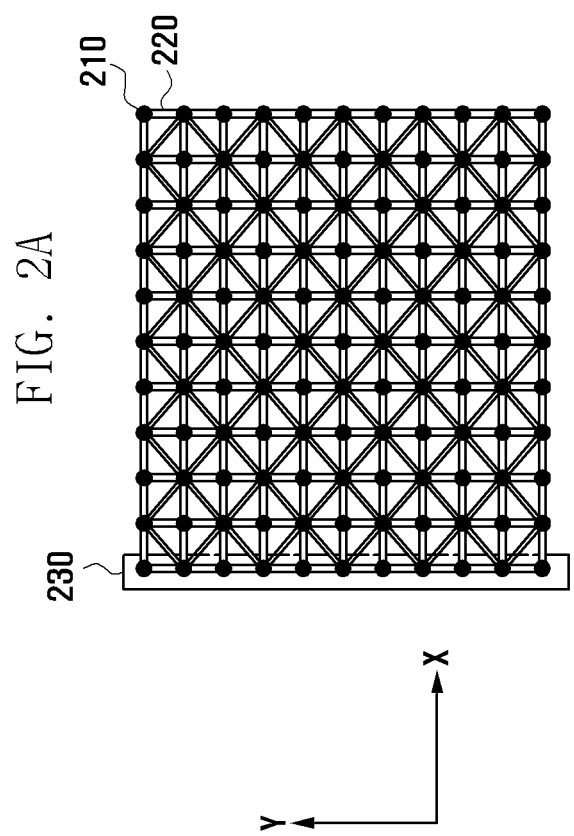
Figure 2B:
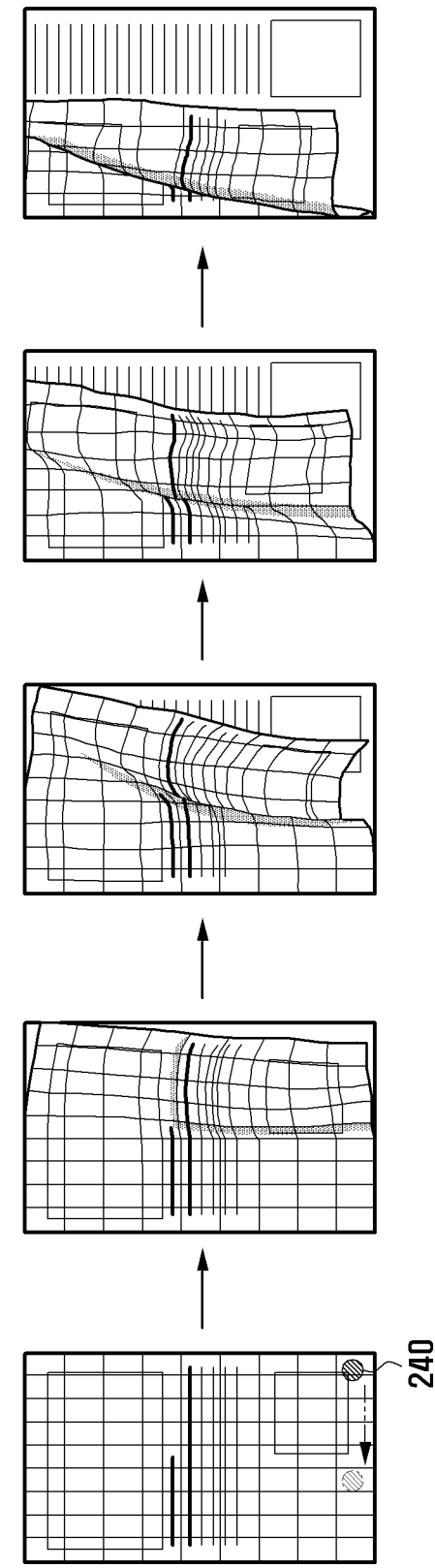

FIGS. 2A to 2C illustrate page meshes according to an exemplary embodiment.

As shown in FIG. 2A, the controller 190, or the GPU 191, forms a page mesh. A page mesh includes a number of nodes 210 and a number of links 220 connecting the nodes. For the sake of convenient description, reference numbers 210 and 220 represent a node and a link respectively. The nodes 210 are arrayed in a matrix form and may be represented via x and y coordinates. As described above, the nodes 210 are allocated with masses respectively, and the links 200 (serving as springs) are allocated with the coefficients of elasticity respectively. The nodes 210 arrayed close to and along the gutter 230 of an e-book are allocated with a larger mass by rows than those nodes 210 arrayed close to and along the side edge opposite the gutter 230. Therefore, the movement of the nodes 210 becomes lighter in a direction moving towards the side edge. That is, the nodes 210 become more sensitive according to a touch gesture in a direction moving closer to the side edge. The nodes 210 located at the gutter 230 are fixed (do not move) while the other nodes 210 on a page are moved when the page is turned over. According to another exemplary embodiment, all of the nodes 210 may be allocated with the same mass. According to this other exemplary embodiment, the motion of a page mesh is heavier than that of the page mesh in the previously described exemplary embodiment. Therefore, the deformation degrees of the pages differ from each other according to the properties (e.g., thickness, weight, materials, etc.) set to corresponding pages. In addition, the deformation degrees of the pages differ from each other according to the calculated tilts.

If a user applies user input, such as a force (e.g., a touch gesture), to a page, the controller 190, (e.g., the GPU 191) detects the touch gesture, deforms a page mesh in response to the detected touch gesture, and creates an animation of the page by displaying the page to reflect the deformed page mesh.

As shown in FIG. 2B, if the user touches a spot 240 at the bottom right of a page via an object (e.g., a finger, a stylus pen, etc.), the GPU 191 detects the node touched by the object. After that, if the user moves the object from the spot 240 at the bottom right to the left, the GPU 191 moves the touched node (hereinafter also referred to as 'target node') on the X-Y plane in the left direction according to the movement of the object. In this case, the target node is moved in the direction perpendicular to the direction of the force of gravity. The GPU 191 calculates the displacement of the moving target node. The displacement is a vector. The magnitude of the displacement includes at least one of the current location of the target node, the distance which the target node moves, and the speed of the target node, or a combination thereof.

As shown in (a) of FIG. 2C, if the user presses on a center spot 250 of a page via an object (e.g., a finger, a stylus pen, etc.), the controller 190 detects the pressed target nodes and the strength of the press. The controller 190 moves the target nodes in the direction of the press, in this case, the direction of the force of gravity 260, according to the strength of the press as shown in (b) of FIG. 2C, and then calculates the displacement.

The controller 190 deforms a page mesh according to the calculated displacement. For example, as shown in FIG. 2B, while the spot 240 at the bottom right is being moved from the right to the left, the page mesh around the spot 240 is deformed in a protruding manner in a direction along the positive Z-axis. Likewise, as shown in (a) and (b) of FIG. 2C, the controller 190 deforms the page mesh at the center spot 250 and the surrounding portion in such a way that the deformation is shown as a depressed shape. The controller 190 creates an animation of the page by reflecting the deformed page mesh on the page.

The GPU 191 can calculate the magnitudes of the forces applied to the respective nodes by using the calculated displacements. The forces are vectors. In an embodiment, the force refers to a net force acquired by computing the vector sum of an elastic force, the force of gravity and a user's applied force (virtual human power associated with a user gesture, e.g., speed and/or moving distance of touch input). If the page turning mode is set as a gradient mode or a merge mode, the force may further include the tilt components. The GPU 191 calculates locations of respective nodes by using the calculated forces. After that, the GPU 191 creates an animation of pages turning by using the calculated locations, as shown in FIG. 2B.

According to exemplary embodiments, the GPU 191 may move the target nodes (which are being subjected to the user's force) in a direction perpendicular to the direction of the force or gravity. That is, the Z-axis component may be altered or may be zero according to the alteration of the X- and Y-axis components. The GPU 191 does not alter the values of the nodes arrayed at the gutter 230. This operation is substantially the same operation as if the user turns over pages of a paper book. Therefore, the animation of page turning is displayed in such a way that the page is turned over, in a manner protruding toward the user side, as shown in FIG. 2B.

As described above with reference to FIGS. 2A to 2C, page meshes are deformed as if paper pages are turned over according to a touch point, the movement direction of a touch, the speed of a touch, etc. Therefore, the users who turn over pages of an e-book via the mobile device can experience substantially the same feeling as the feeling of turning over pages of a paper book.

Figure 3:
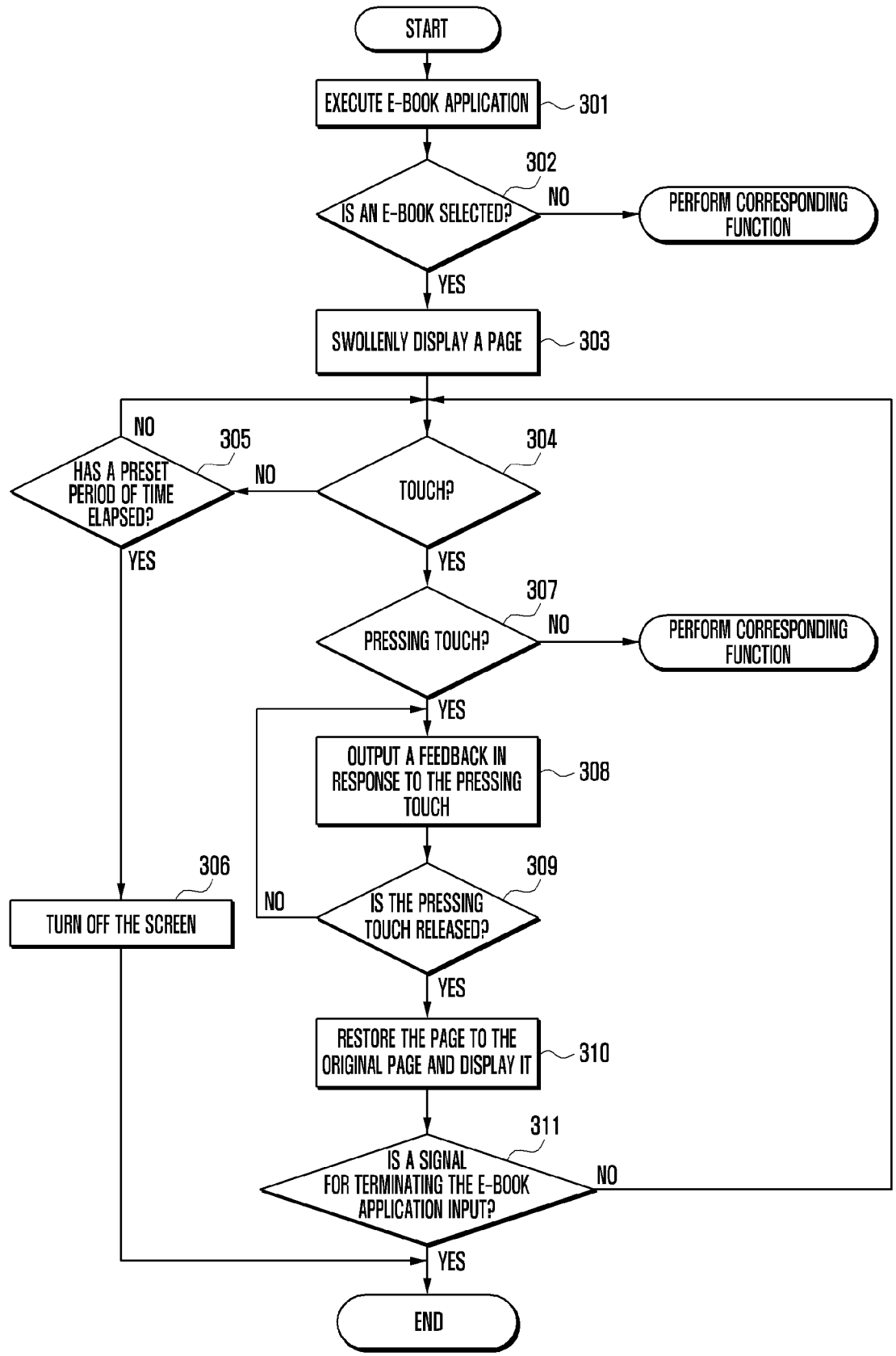
FIG. 3 illustrates a flow chart that describes a method for displaying pages of an e-book method according to an exemplary embodiment.

FIG. 3 illustrates a flow chart that describes a method for displaying pages of an e-book method according to an exemplary embodiment.

Referring to FIG. 3, the controller 190 initially operates in an idle state. During the idle state, the controller 190 may, for example, display a home screen including an icon for executing an e-book application.

When the controller 190 detects a touch gesture to execute an e-book application, the controller 190 executes the application and displays a bookcase on the touch screen 110 at operation 301. The controller 190 determines whether a touch gesture selects one of a number of icons corresponding to an e-book at operation 302. The exemplary embodiment may also be modified to omit operation 302. In this case, when the e-book application is executed, the mobile device 100 displays pages of a corresponding e-book.

If the controller 190 detects a touch gesture that selects one icon corresponding to an e-book at operation 302, the controller 190 loads pages of the selected e-book from the e-book database, and displays the pages on the display unit 112 at operation 303. For example, the controller 190 displays pages of the e-book in a protruding manner on the display unit 112 to resemble pages of a paper book open on a desk. Alternatively, the controller 190 may evenly display pages of the e-book on the display unit 112. The option as to whether pages are displayed in a protruding manner or evenly displayed may be set in the setting mode of the mobile device 100 according to a user's settings. The controller 190 displays the edge of an e-book, showing the volume (thickness) of the e-book. That is, the controller 190 displays the edge (fore edge) of an e-book, showing the volume (thickness) proportional to the remaining pages to be read with respect to the currently displayed page. For example, if an e-book has a total of 100 pages and is currently displaying Page 21, there are 80 remaining pages. In this case, the controller 190 controls the display unit 112 to display the edge with a thickness corresponding to the remaining 80 pages. As another example, if there are 20 pages remaining, the controller 190 controls the display unit 112 to display the edge with a thickness corresponding to the remaining 20 pages. The controller 190 may display the edge of an e-book, showing the thicknesses by a unit of preset pages. For example, if a unit of preset pages is 10, the controller 190 displays the edge of an e-book so that the remaining pages are in the same thickness while turning pages from Page 1 to 10. After that, if the e-book is turned to Page 11, the controller 190 displays the edge so that the remaining page is one level thinner than the previous remaining page (Pages 1 to 10). The unit of pages may be set by the user. Alternatively, the controller 190 may display the volume of an e-book in proportion to the thickness of each page (sheet). For example, referring to table 1, although a sketch book and a book of printed paper may have the same number of pages, the sketch book is thicker in volume than the book of printed paper, and thus, the volume of the sketch book may be displayed to be thicker than the volume of the book of printed paper. In addition, if an e-book is first executed, the controller 190 displays the contents of the first page on the display unit 112. On the contrary, if an e-book that the user has already started to read is executed, the controller 190 displays the user's most recently read page on the display unit 112.

According to exemplary embodiments, if the controller 190 detects a touch gesture for requesting the execution of other functions, other than the touch gesture for selecting an e-book at operation 302, the controller 190 executes the corresponding function, e.g., a bookcase editing function.

After displaying pages of the selected e-book on the display unit 112 at operation 303, the controller 190 determines whether a touch is made at operation 304. If the controller 190 ascertains that a touch has not been made at operation 304, the controller 190 determines whether a preset period of time has elapsed at operation 305. The preset period of time refers to a time interval set to automatically turn off the touch screen 110 after the time interval has elapsed. If the controller 190 does not detect any touch during the period of time at operation 305, the controller 190 turns off the touch screen 110 at operation 306. The period of time may be set by the user. For example, the period of time may be set to 30 seconds. The exemplary embodiment may also be modified in such a way that operation 306 is omitted. In this case, if the period of time has elapsed, the procedure is terminated.

If the controller 190 ascertains that a touch has been made at operation 304, the controller 190 further determines whether the touch is a touch gesture (e.g., a press), by calculating a time period during which the touch contacts the touch screen 110 at operation 307. For example, if a time period during which the touch contacts the touch screen is greater than 0.5 seconds, the controller 190 identifies that the touch is a touch gesture (e.g., a press). The time period of a touch contacting the touch screen may be set by the user or the manufacturer. If the detected touch gesture is determined to be a flick or a drag at operation 307, the controller 190 executes the corresponding function, e.g., the creation of an animation of a page turning.

If the detected touch gesture is determined to be a press at operation 307, feedback (e.g., an animation, a sound effect, a vibration, etc.) is output at operation 308. The controller 190 identifies whether a touch gesture is a press via a signal corresponding to the touch event transferred from the touch panel controller 130. The controller 190 acquires pressure information that includes the strength of the press and a location where the press occurs. The controller 190 deforms a page and displays the deformed page, based on the acquired pressure information. The controller 190 may create a variety of animations. For example, the controller 190 may create an animation of a press in which the spot of the press is shown as becoming deeper in a direction moving closer to the gutter (or spine) of an e-book and displays the spot on the display unit 112. Also, the controller 190 may create an animation of a press in which the spot of the press is shown as becoming shallower (less deep) in a direction moving closer to the edge of an e-book and displays the spot on the display unit 112. Further, the controller 190 may create an animation of a press in which the spot of the press is shown as becoming deeper as the strength of the press becomes greater and displays the spot on the display unit 112. Also, the controller 190 may create an animation of a press in which the spot of the press is shown as becoming shallower as the strength of the press becomes less and displays the spot on the display unit 112. The controller 190 may provide pages with a variety of visual effects according to the number of remaining pages with respect to the pressed page. For example, the controller 190 may create an animation of a page in which the spot of the press is shown as becoming deeper as the number of remaining pages becomes greater and displays the spot on the display unit 112. Also, the controller 190 may create an animation of a page in which the spot of the press is shown as becoming shallower as the number of remaining pages becomes less and displays the spot on the display unit 112. The controller 190 provides pages with a variety of visual effects according to the thickness of a page. That is, the controller 190 may create an animation of a page in which the spot of the press is shown as becoming deeper as the thickness of a page becomes thinner displays the spot on the display unit 112. Also, the controller 190 may create an animation of a page in which the spot of the press is shown as becoming shallower as the thickness of a page becomes greater and displays the spot on the display unit 112. As described above, the controller 190 creates animations of pages, based on one or more of a location to which a press is applied, the strength of the press, the number of remaining pages, and the thickness of a page or a combination thereof.

The controller 190 may output sound effects as a type of feedback in response to a press at operation 308. The sound effects may differ according to various factors, such as a location at which a press is applied, the strength of the press, the number of remaining pages, the thickness of a page, and the duration of the press. For example, the controller 190 may continue to output a sound effect during the duration of a press. For example, if a press is executed for more than 2 seconds, the controller 190 may output a sound effect of an echo. The controller 190 may output a dull sound if the location of a press is close to the outer part (edges) of an e-book and an echo if the location of a press is close to the inner part. Likewise, the controller 190 may output a low-pitched sound if the strength of a press is small and a high-pitched sound if the strength of a press is large. Alternatively, as the strength of a press becomes greater, the volume of the output sound may become larger. The controller 190 may output a dull sound if the number of remaining pages is relatively small and an echo if the number of remaining pages is large. It is understood that these sounds are exemplary only, and that many different types of sounds may be output according to exemplary embodiments.

In addition, the controller 190 may output vibrations as a type of feedback in response to a press at operation 308. The vibrations may differ according to a location to which a press is applied, the strength of the press, the number of remaining pages, the thickness of a page, and the duration of the press. For example, the controller 190 may output a relatively large magnitude of vibration if the strength of a press is great and a relatively small magnitude of vibration if the strength of a press is relatively less. Alternatively, as the strength of a press becomes greater, the magnitude of vibration becomes larger. The controller 190 may continue to output a vibration during the duration of a press. It is understood that many different types of vibrations may be output according to exemplary embodiments.

After outputting feedback at operation 308, the controller 190 determines whether the press is released at operation 309. If the controller 190 detects the presence of the press at operation 309, the method returns to operation 308 and continues to output the feedback. On the contrary, if the controller 190 ascertains that the press is released at operation 309, the method recovers (restores) the page deformed by the press to the original form of the page and displays the page having the original form on the display unit 112 at operation 310. After that, the controller 190 determines whether a command is input to terminate the execution of the current e-book at operation 311. If the controller 190 ascertains that a command is not input to terminate the execution of the current e-book at operation 311, the method returns to operation 304 and performs the steps following thereof.

Figure 4:
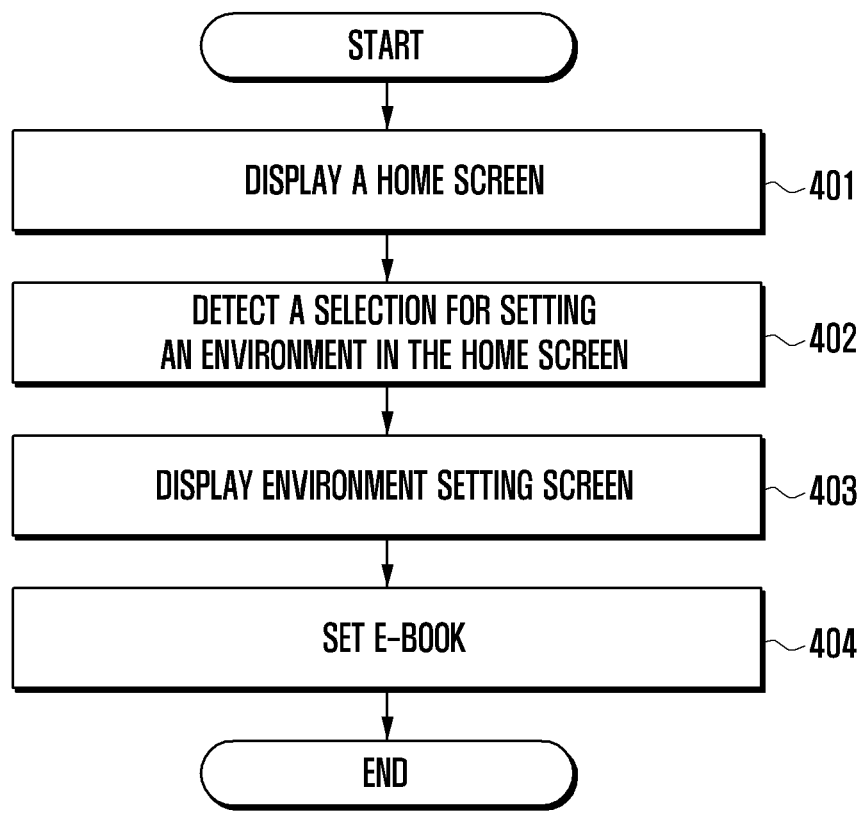
FIG. 4 illustrates a flow chart that describes a method for setting an e-book according to an exemplary embodiment.

FIG. 4 illustrates a flow chart that describes a method for setting an e-book according to an exemplary embodiment.

Referring to FIG. 4, the controller 190 controls the display unit 112 to display a home screen at operation 401. The home screen shows an icon corresponding to the settings for the mobile device 100. If the user touches the icon corresponding to the settings, the controller 190 detects the user's touch thereon at operation 402. The controller 190 controls the display unit 112 to display a screen corresponding to the settings for the mobile device 100 at operation 403. The user can operate the touch panel 111 on the preference setting screen to set the preference for the mobile device 100, in particular, the environment for an e-book. The information regarding the settings for e-books is stored in the storage unit 140, and is used when the e-book application 142 is executed. The preference setting screen may include a variety of items according to the performance and functions of the mobile device 100. For example, the preference setting screen may include a number of items related to a wireless network, a location service, sound, display, security, e-books, etc. If an e-book item is touched, the controller 190 controls the display unit 112 to display a screen for setting e-books at operation 404, which is shown in FIG. 5.

Figure 5:
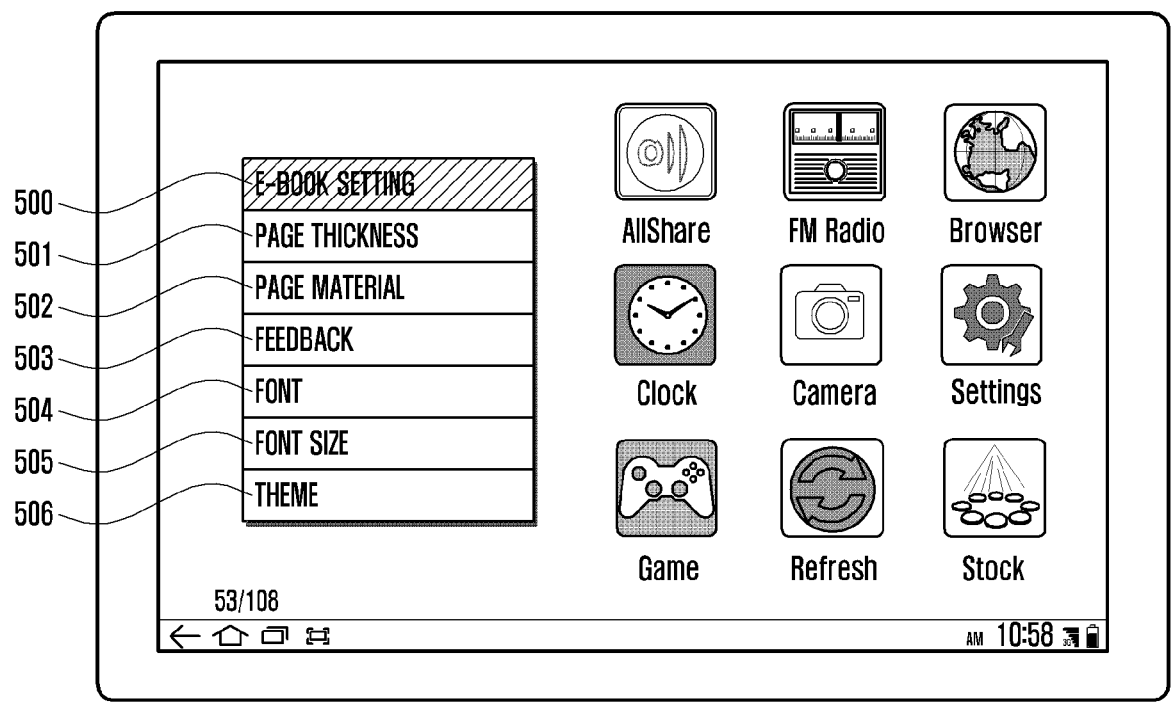
FIG. 5 illustrates a screen for setting an e-book, according to an exemplary embodiment.

FIG. 5 illustrates a screen for setting e-books, according to an exemplary embodiment.

Referring to FIG. 5, the display unit 112 displays an e-book setting screen 50 under the control of the controller 190. The e-book setting screen 500 includes a number of items, including page thickness 501, page material 502, feedback 503, font 504, font size 505, and theme 506. Page thickness 501 and page material 502 may be set, for example, as a printed paper, 75 g/m$^2$, as described in table 1. Feedback 503 is an item to set a type of feedback to be provided to the user. For example, the user may set feedback 503 to enable one or more, all, or any other combination of the animation, vibration, and sound effects to operate. Font 504 and font size 505 are items to set the font and size of letters when the font 504 and font size 505 are displayed on the display unit 112. For example, font 504 and font size 505 may be set to 'Gothic' and '12 point,' respectively. Theme 506 is an item to set the background of pages. For example, the background of pages may be set to white via theme 506.

A detailed description of the exemplary embodiments will be provided with reference to the exemplary screens. The types of display modes for a screen are divided into a landscape mode and a portrait mode. The mobile device 100 displays two pages side by side in a landscape mode and one page in a portrait mode. It should be understood that the exemplary embodiments are not limited to only these two types of display modes, and may also have various other types of display modes. If the user orientates the mobile device 100, the sensing unit 185 detects the orientation and transfers the signal to the controller 190. In that case, the controller 190 determines the display mode, based on the signal of the detected orientation state.

Figure 6A:
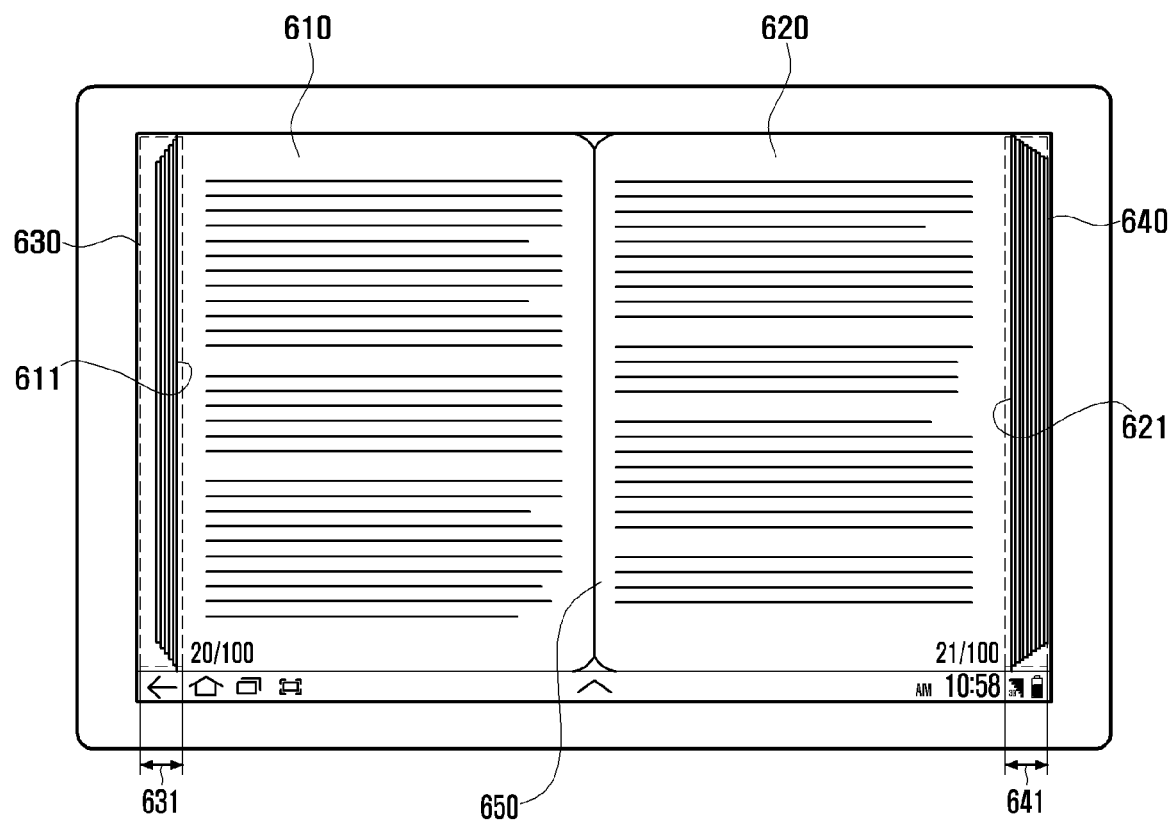
FIGS. 6A and 6B illustrate screens to describe a volume of an e-book, according to an exemplary embodiment.
Figure 6B:
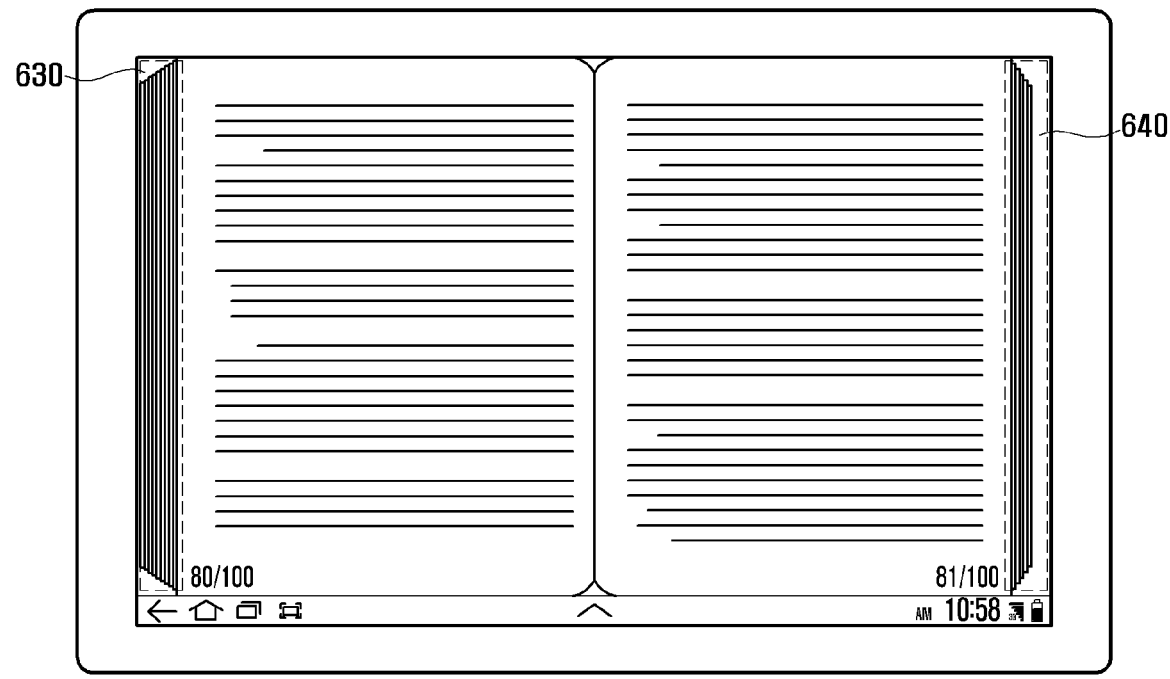

FIGS. 6A and 6B illustrate screens to describe a volume of an e-book, according to an exemplary embodiment.

As shown in FIG. 6A, the controller 190 controls the display unit 112 to operate in a landscape mode in which one part 610 of the pages and the other part 620 of the pages of an e-book are displayed side by side. One part of pages 610 is located at the left portion of the screen and is also referred to as a first part of pages 610. Likewise, the other part of pages 620 is located at the right portion of the screen and is also referred to as a second part of pages 620. The first part of pages 610 is displayed together with the corresponding volume via the fore edges. The second part of pages 620 is also displayed together with the corresponding volume via the fore edges. Each volume is proportional to the thickness corresponding to the number of pages (sheets) under the currently opened page. For example, if an e-book with a total of 100 pages is opened at Page 20 and Page 21, side by side, on left and right portions of the screen, the fore edges of 20 pages are displayed, with the corresponding thickness, on the left portion of the screen and the fore edges of the remaining 80 pages are displayed, with the corresponding thickness, on the right portion of the screen. As shown in FIG. 6A, the display unit 112 displays the volume of the second part of pages 620 to be thicker than the volume of the first part of pages 610. The volume of an e-book is proportional to the thickness set to a page. That is, the volume of the e-book becomes larger as the thickness of the page is set to be thicker. In this exemplary description, one part and the other part of pages of the total number of pages refers to an example in which each part includes one or more pages.

The display unit 112 displays the fore edges 611 of the first part of pages 610 on a first volume area 630, which are called left fore edges 611 since the fore edges 611 are located at the left portion of the screen. Likewise, the display unit 112 also displays the fore edges 621 of the second part of pages 620 on a second volume area 640, which are called right fore edges 621 since the fore edges 621 are located at the right portion of the screen. The reference number 650 indicates the gutter of the e-book. First width 631 and second width 641 of the first volume area 630 and second volume area 640 are proportional to the number of pages, respectively. For example, if an e-book with a total of 100 pages is opened in such a way that Page 20 and Page 21 are displayed on the first part of pages 610 and the second part of pages 620, respectively, fore edges corresponding to 20 and 80 pages are displayed on the first volume area 630 and second volume area 640, respectively. Therefore, as shown in FIG. 6A, the volume shown in the second volume area 640 is greater than the volume shown in the first volume area 630. According to such a principle, if pages are turned over, the volumes shown in the first and second volume areas are varied. For example, the controller 190 may turn over a number of pages (e.g., 60 pages) from the right part of pages to the left part of pages in response to a user's touch gesture for turning pages. In that case, as shown in FIG. 6B, the volume shown in the first volume area 630 becomes greater than the volume shown in the second volume area 640.

Figure 7A:
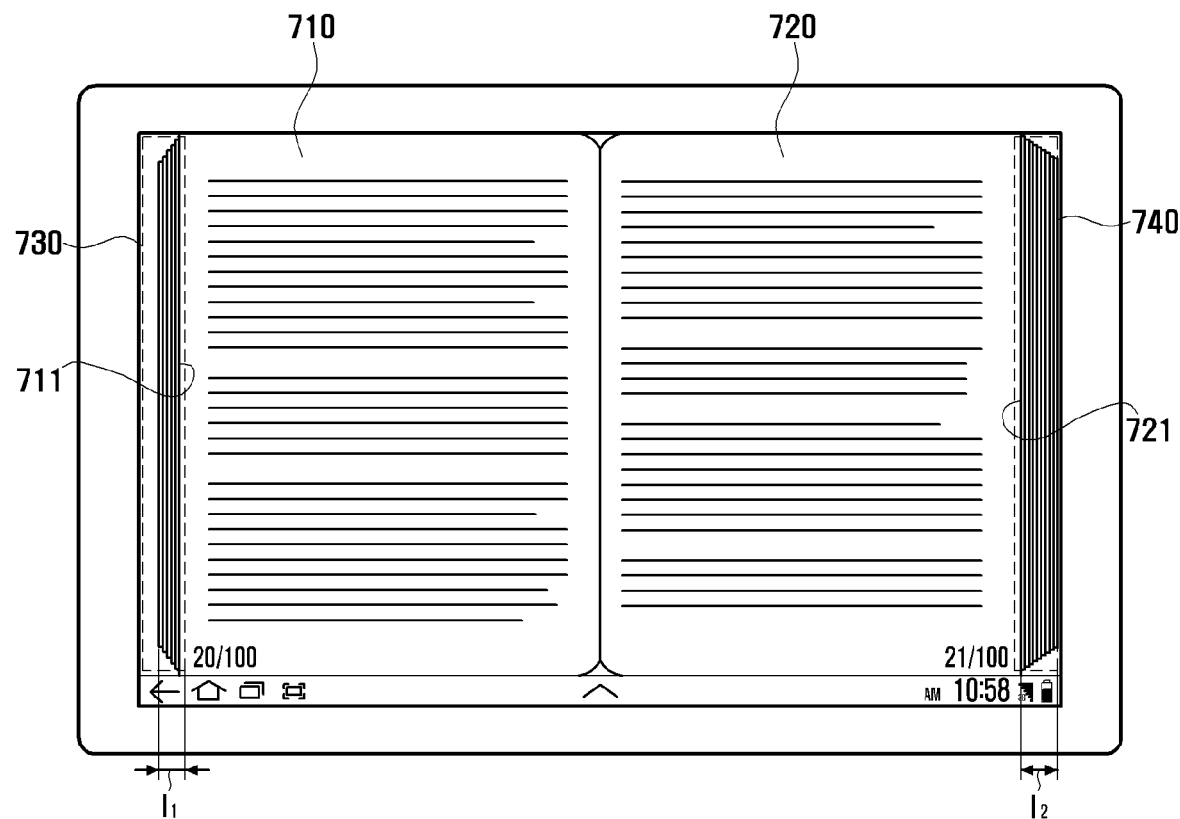
FIGS. 7A and 7B illustrate screens to describe a display form of pages of an e-book, according to an exemplary embodiment.
Figure 7B:
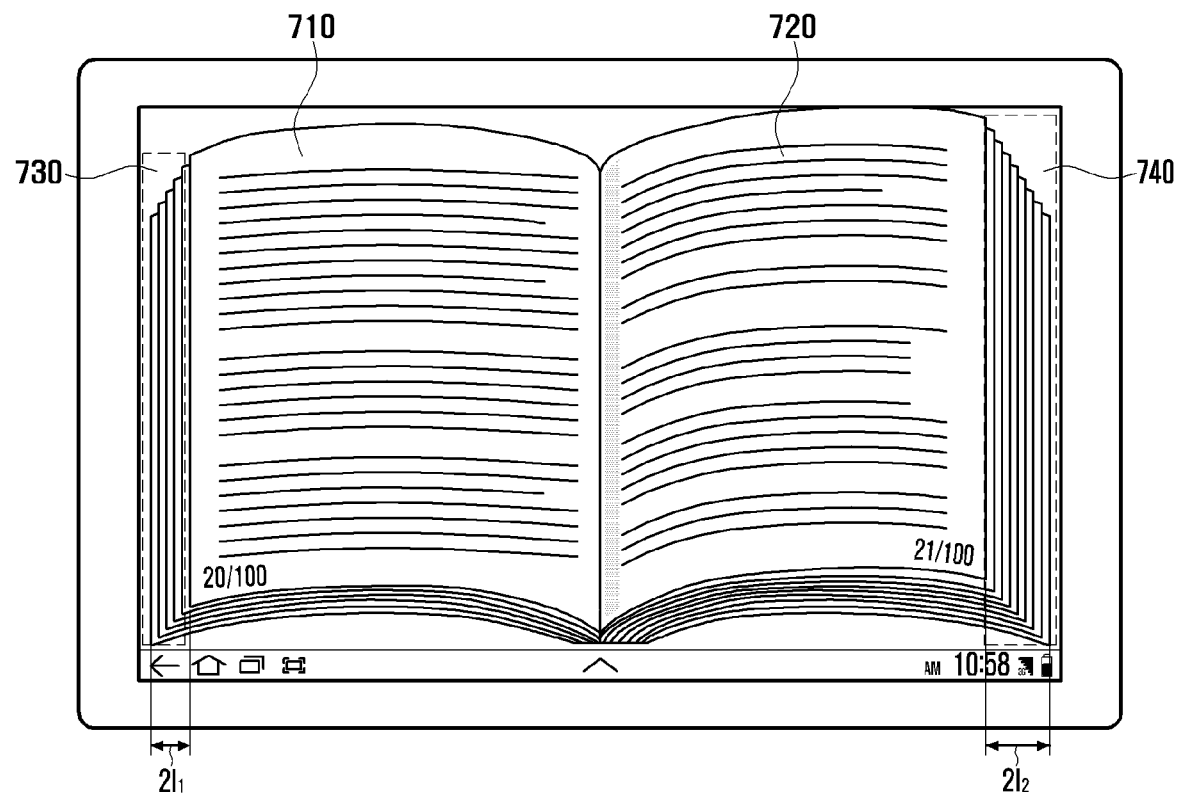

FIGS. 7A and 7B illustrate screens to describe a display form of pages of an e-book, according to an exemplary embodiment.

As shown in FIG. 7A, the controller 190 controls the display unit 112 to display one part 710 and the other part 720 of pages of an e-book, side by side, in flat form. One part of pages 710 is located at the left portion of the screen and is called a first part of pages. Likewise, the other part of pages 720 is located at the right portion of the screen and is called a second part of pages. According to an exemplary embodiment, the term 'Displaying pages in flat form' refers to an operation in which the top and bottom edges of the first parts of pages 710 and the second parts of pages 720, except for their fore edges, are displayed in parallel as shown in FIG. 7A. The display unit 112 displays the fore edges 711 of the first part of pages 710 on a first volume area 730, which is called left fore edges 711. Likewise, the display unit 112 also displays the fore edges 721 of the second part of pages 720 on a second volume area 740, which is called right fore edges 721. First width $I_1$ and second width $I_2$ of the first volume area 730 and second volume area 740 are proportional to the number of pages, respectively.

As shown in FIG. 7B, the controller 190 may control the display unit 112 to display one part 710' and the other part 720' of pages of an e-book, side by side, in a protruding form to resemble open pages of an actual paper book. One part of pages 710' is located at the left portion of the screen and is also referred to as a first part of pages. Likewise, the other part of pages 720' is located at the right portion of the screen and is called a second part of pages. According to an exemplary embodiment, the term 'Displaying pages in a protruding form' refers to an operation in which the top and bottom edges of the first parts of pages 710' and the second parts of pages 720' displayed in a protruding manner and having a curved form and the first volume area 730' and second volume area 740' showing the fore edges accordingly increase in area as compared to the areas shown in FIG. 7A, as shown in FIG. 7B. For example, the controller 190 controls the display unit 112 to display the first volume area 730' and second volume area 740' in such a way that their widths are twice as great as the widths of the first volume area 730 and second volume area 740 shown in FIG. 7A.

As described above, the controller 190 controls the display unit 112 to display pages of an e-book in flat or a protruding form. Such an e-book display mode may be set via e-book preference settings.

FIGS. 8A to 8B through FIGS. 13A and 13B illustrate screens that describe a first exemplary embodiment of a page display method.

Figure 8B:
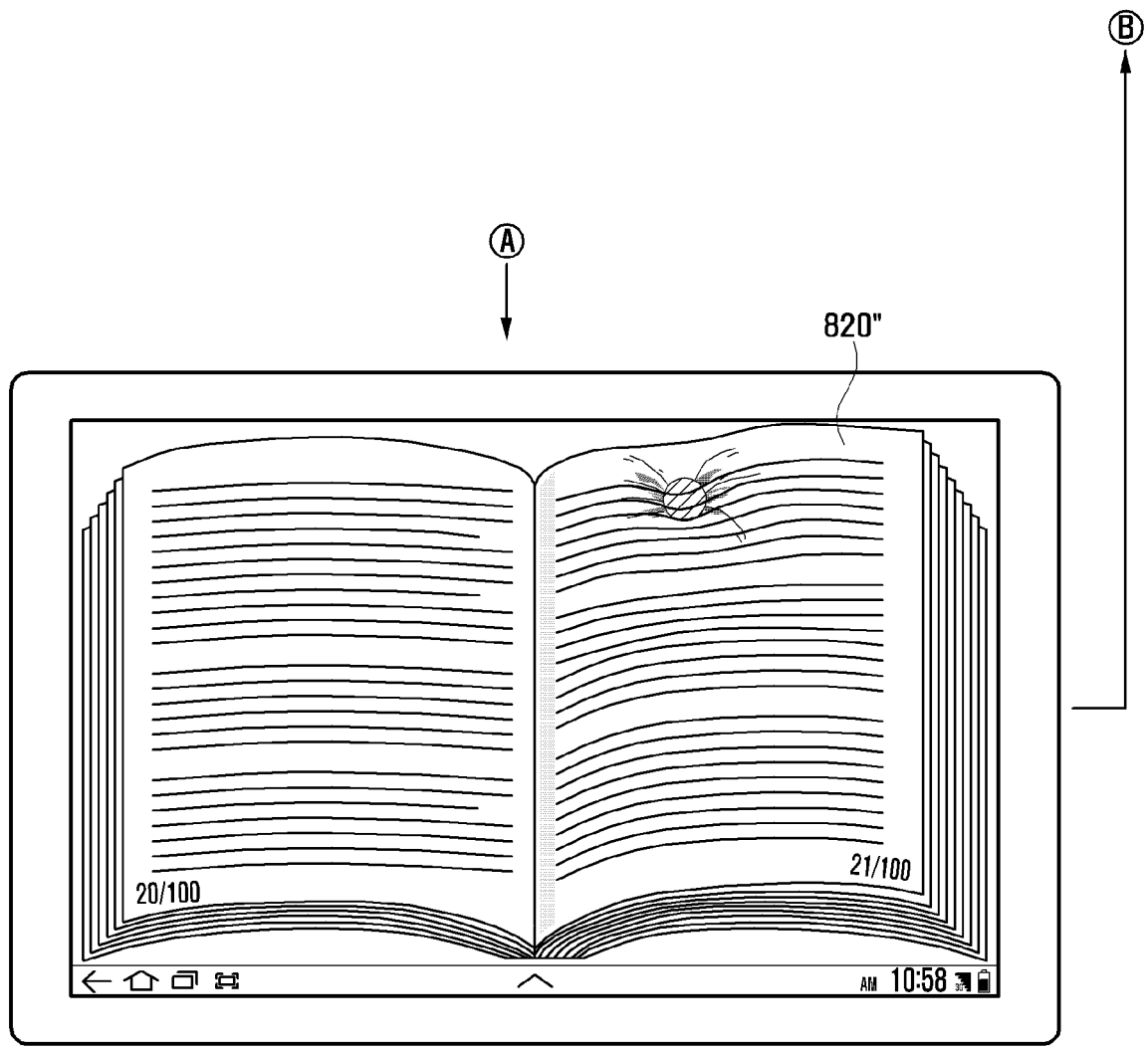

As shown in (a) of FIG. 8A, the controller 190 controls the display unit 112 to operate in a landscape mode and to display one part of pages 810 and the other part of pages 820 of an e-book, side by side, in a protruding form. One part of pages 810 is located at the left portion of the screen and is called a first part of pages. Likewise, the other part of pages 820 is located at the right portion of the screen and is called a second part of pages. It should be understood that the controller 190 may control the display unit 112 to display one part of pages 810 and the other part of pages 820 of an e-book, side by side, in flat form. If the controller 190 detects a touch at a spot 821 in the top left of the first page on the second part of pages 820 and a first press exceeding a preset period of contact time, the controller 190 controls the display unit 112 to display the page where the spot 821 has been subject to the strength of the press, which is called a second page 820' of the second part of pages 820, as shown in (b) of FIG. 8A. If the controller 190 detects a second press at the same spot 821 that has been subject to a strength of press twice as great the strength of the first press, the controller 190 controls the display unit 112 to display the page that has been subject to the second press, which is called a third page 820" of the second part of pages 820, as shown in FIG. 8B. If the second press is released, the controller 190 controls the display unit 112 to restore the third page 820" to the original page, i.e., the first page, of the second part of pages 820 as shown in (a) of FIG. 8A.

As shown in (a) of FIG. 9, the controller 190 controls the display unit 112 to operate in a landscape mode and to display one part of pages 910 and the other part of pages 920 of an e-book, side by side, in a protruding form. One part of pages 910 is located at the left portion of the screen and is called a first part of pages. Likewise, the other part of pages 920 is located at the right portion of the screen and is called a second part of pages. If the controller 190 detects a touch at a spot 921 in the top right of the first page on the second part of pages 920 and a press exceeding a preset period of contact time, the controller 190 controls the display unit 112 to display the page where the spot 921 has been subject to the strength of the press, which is called a second page 920' of the second part of pages 920, as shown in (b) of FIG. 9.

As shown in (a) of FIG. 10, the controller 190 controls the display unit 112 to operate in a landscape mode and to display one part of pages 1010 and the other part of pages 1020 of an e-book, side by side, in a protruding form. One part of pages 1010 is located at the left portion of the screen and is called a first part of pages. Likewise, the other part of pages 1020 is located at the right portion of the screen and is called a second part of pages. If the controller 190 detects a touch at a spot 1021 in the middle left of the first page on the second part of pages 1020 and a press exceeding a preset period of contact time, it controls the display unit 112 to display the page where the spot 1021 has been subject to the strength of the press, which is called a second page 1020' of the second part of pages 1020, as shown in (b) of FIG. 10.

Figure 11:
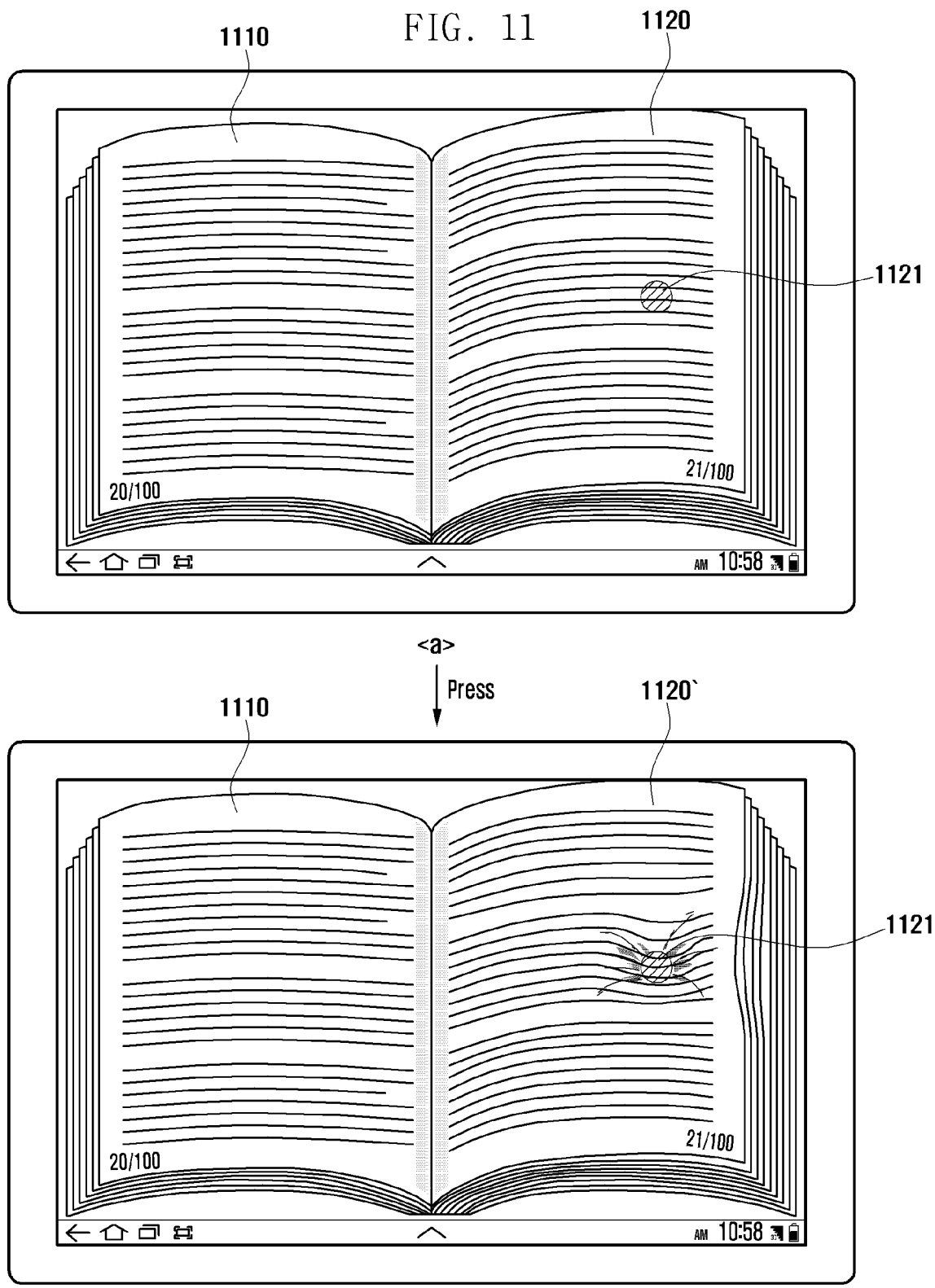

As shown in (a) of FIG. 11, the controller 190 controls the display unit 112 to operate in a landscape mode and to display one part of pages 1110 and the other part of pages 1120 of an e-book, side by side, in a protruding form. One part of pages 1110 is located at the left portion of the screen and is called a first part of pages. Likewise, the other part of pages 1120 is located at the right portion of the screen and is called a second part of pages. If the controller 190 detects a touch at a spot 1121 in the middle right of the first page on the second part of pages 1120 and a press exceeding a preset period of contact time, the controller 190 controls the display unit 112 to display the page where the spot 1121 has been subject to the strength of the press, which is called a second page 1120' of the second part of pages 1120, as shown in (b) of FIG. 11.

As shown in (a) of FIG. 12, the controller 190 controls the display unit 112 to operate in a landscape mode and to display one part 1210 and the other part 1220 of pages of an e-book, side by side, in a protruding form. One part of pages 1210 is located at the left portion of the screen and is called a first part of pages. Likewise, the other part of pages 1220 is located at the right portion of the screen and is called a second part of pages. If the controller 190 detects a touch at a spot 1221 in the bottom left of the first page on the second part of pages 1220 and a press exceeding a preset period of contact time, the controller 190 controls the display unit 112 to display the page where the spot 1221 has been subject to the strength of the press, which is called a second page 1220' of the second part of pages 1220, as shown in (b) of FIG. 12.

As shown in (a) of FIG. 13, the controller 190 controls the display unit 112 to operate in a landscape mode and to display one part of pages 1310 and the other part of pages 1320 of an e-book, side by side, in a protruding form. One part of pages 1310 is located at the left portion of the screen and is called a first part of pages. Likewise, the other part of pages 1320 is located at the right portion of the screen and is called a second part of pages. If the controller 190 detects a touch at a spot 1321 in the bottom right of the first page on the second part of pages 1320 and a press exceeding a preset period of contact time, the controller 190 controls the display unit 112 to display the page where the spot 1321 has been subject to the strength of the press, which is called a second page 1320' of the second part of pages 1320, as shown in (b) of FIG. 13.

Figure 14:
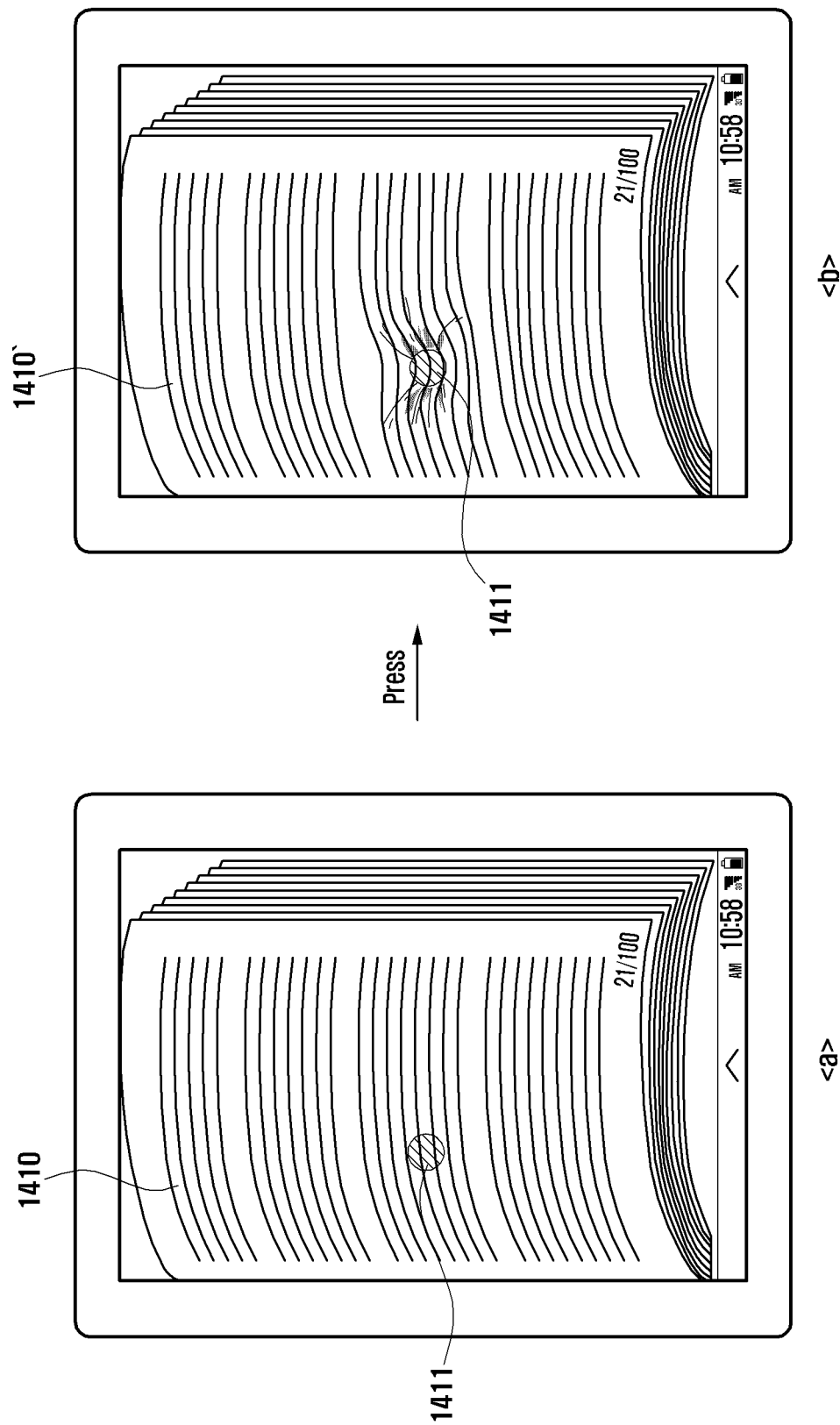
FIGS. 14 and 15 illustrate screens that describe a second exemplary embodiment of a page display method.
Figure 15:
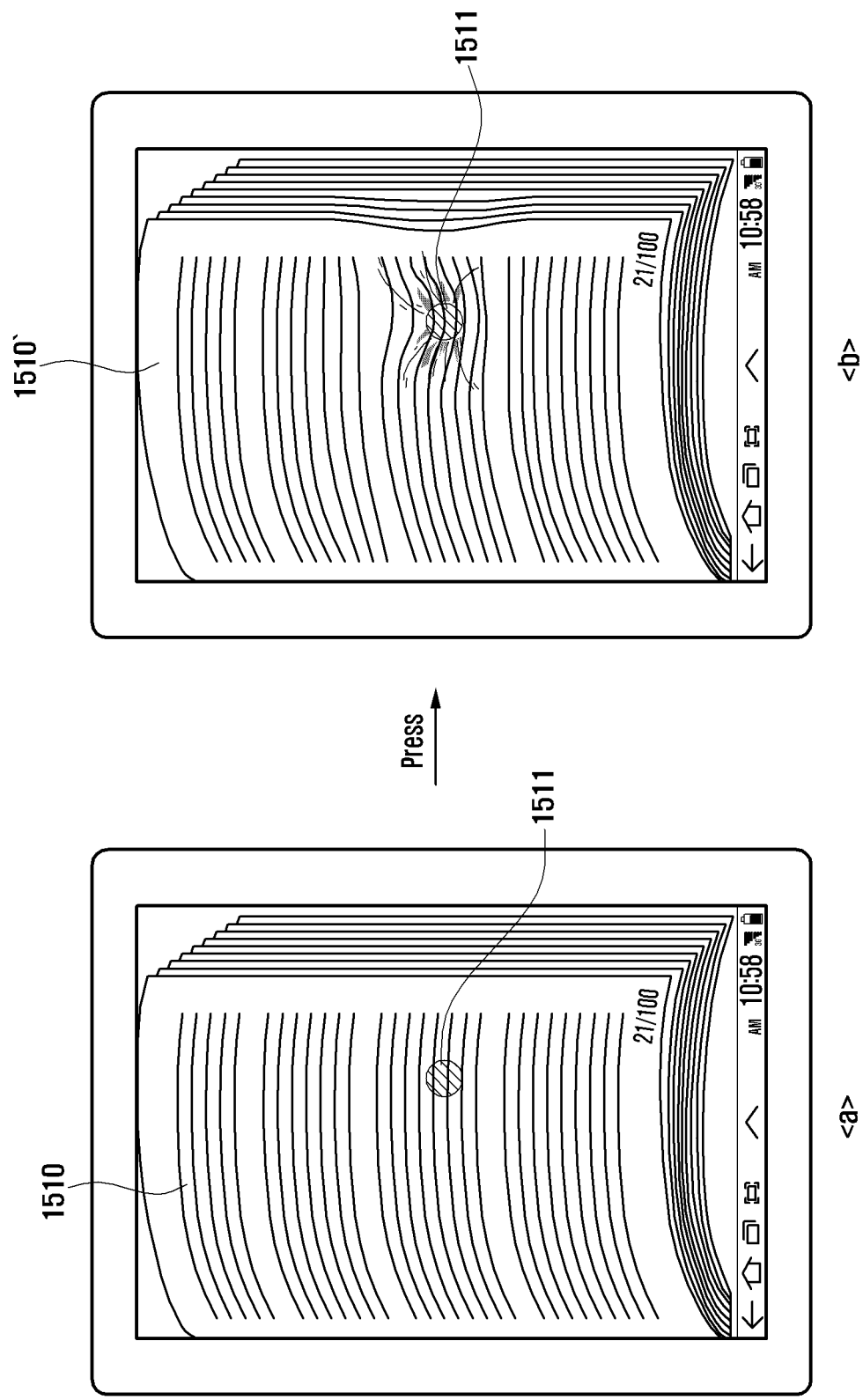

FIGS. 14 and 15 illustrate screens that describe a second exemplary embodiment of a page display method.

As shown in (a) of FIG. 14, the controller 190 controls the display unit 112 to operate in a portrait mode and to display one part of pages 1410 of an e-book, in a protruding form. According to an exemplary embodiment, one part of pages 1410 corresponds to one or more pages at the right side with respect to the gutter when the e-book is opened. If the controller 190 detects a touch at a spot 1411 in the middle left of the first page on one part of pages 1410 and a press exceeding a preset period of contact time, the controller 190 controls the display unit 112 to display the page where the spot 1411 has been subject to the strength of the press, which is called a second page 1410' of the one part of pages 1410, as shown in (b) of FIG. 14.

As shown in (a) of FIG. 15, the controller 190 controls the display unit 112 to operate in a portrait mode and to display one part of pages 1510 of an e-book, in a protruding form.

According to an exemplary embodiment, one part of pages 1510 corresponds to one or more pages at the right side with respect to the gutter when the e-book is opened. If the controller 190 detects a touch at a spot 1511 in the middle right of the first page on the one part of pages 1510 and a press exceeding a preset period of contact time, the controller 190 controls the display unit 112 to display the page where the spot 1511 has been subject to the strength of the press, which is called a second page 1510' of the one part of pages 1510, as shown in (b) of FIG. 15.

As described above, the controller 190 acquires pressure information that includes a location of a spot where a press is generated and the strength of the press. The controller 190 deforms and displays a page based on the acquired pressure information. The controller 190 deforms and displays pages in various forms according to locations of a spot where a press is generated and strengths of the press. That is, as shown in FIGS. 8A to 8B through FIG. 15, the pages of an e-book are deformed differently according to the locations of a spot where a press is generated and the strengths of the press. In addition, pages of an e-book may be deformed differently according to the total number of pages (e.g., more than 200 pages) and the number of remaining pages under a page where a press is detected. For example, as the number of remaining pages becomes greater, the controller 190 creates an animation showing that the pages are pressed deeper and displays the animation. That is, as the number of remaining pages becomes less, the controller 190 creates an animation showing that the pages are pressed less deep and displays the animation. Also, according to another example, the controller 190 may create an animation of pages in such a way that as the number of remaining pages becomes greater, the remaining pages are displayed to be pressed deeper in comparison to a lesser number of remaining pages. The controller 190 provides various visual effects according to the thicknesses of pages. For example, if an e-book is formed with relatively thin pages, the controller 190 displays an animation where the pages are pressed deeply. On the contrary, if an e-book is formed with relatively thick pages, the controller 190 displays an animation where the pages are pressed less deeply. It should be understood that the user can apply a touch and a press to any locations on the page, other than the spots described in the foregoing exemplary embodiments.

FIGS. 16A and 16B through FIG. 19 illustrate screens that describe a third exemplary embodiment of a page display method.

Figure 16A:
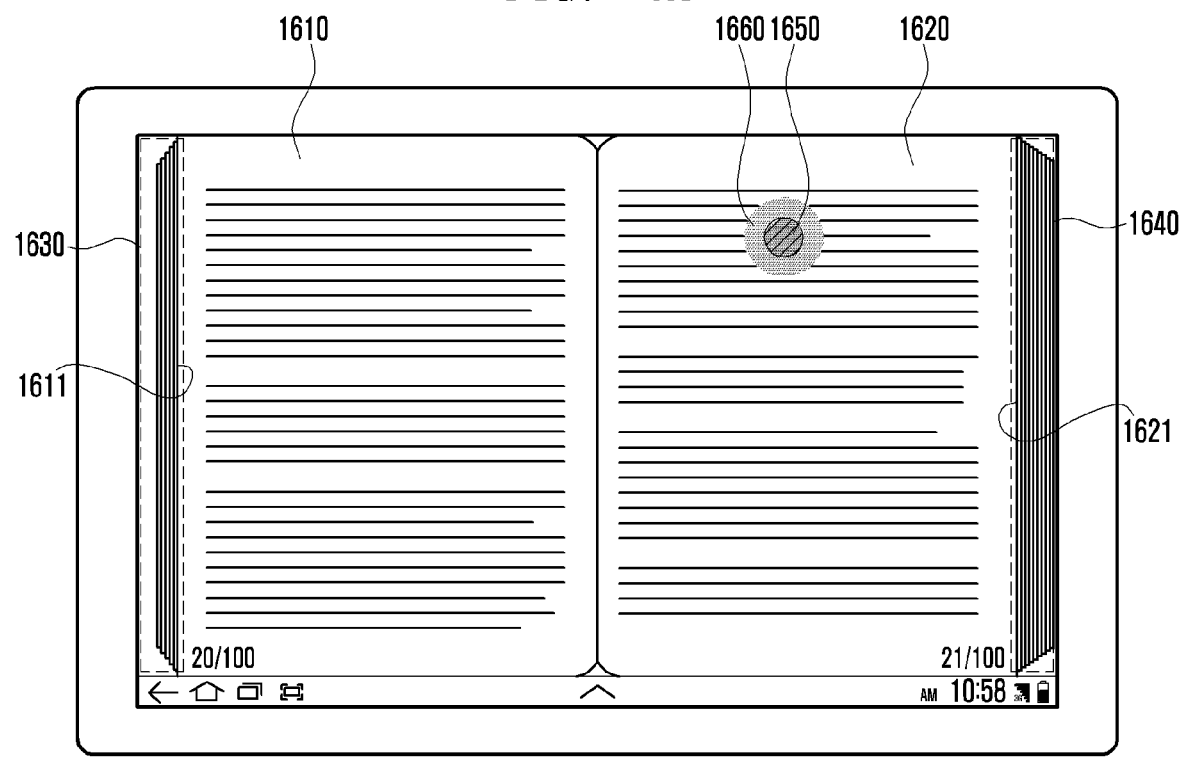
Figure 16B:
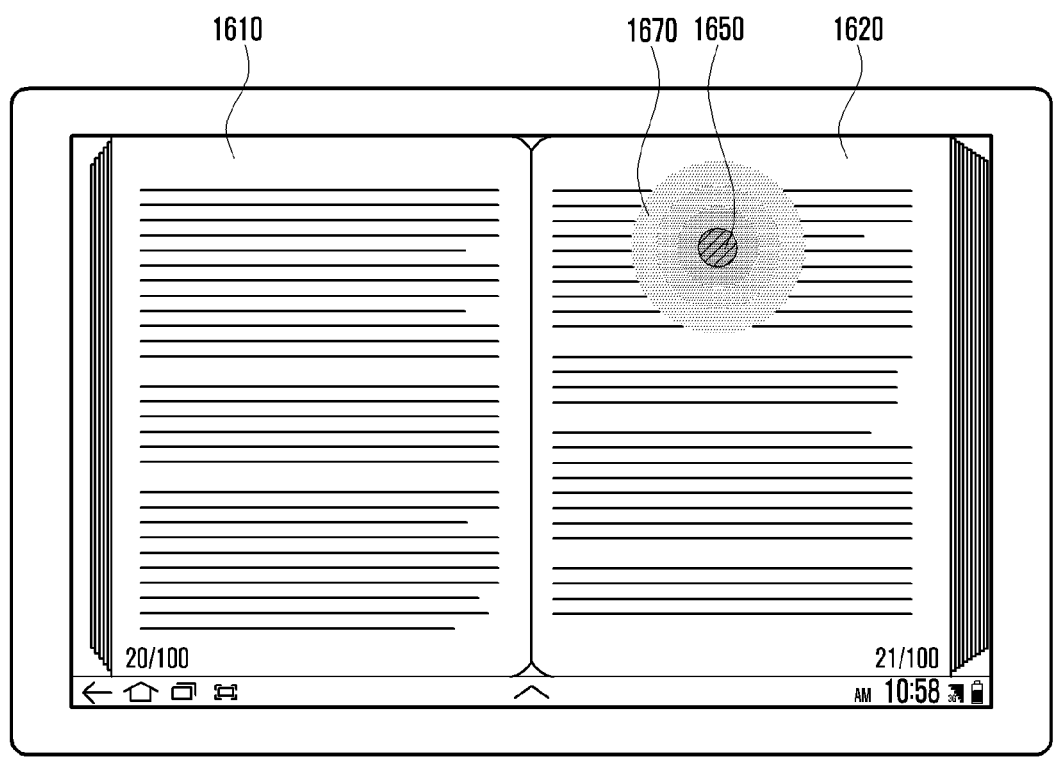

Referring to FIG. 16A, the controller 190 controls the display unit 112 to display one part of pages 1610 and the other part of pages 1620 of an e-book, side by side, in flat form. One part of pages 1610 is located at the left portion of the screen and is called a first part of pages. Likewise, the other part of pages 1620 is located at the right portion of the screen and is called a second part of pages. The display unit 112 displays the fore edges 1611 of the first part of pages 1610 on a first volume area 1630, which is called left fore edges 1611. Likewise, the display unit 112 also displays the fore edges 1621 of the second part of pages 1620 on a second volume area 1640, which is called right fore edges 1621. If the controller 190 detects a touch, for example, at a spot 1650 in the top left of the first page of the second part of pages 1620, exceeding a first contact period of time (e.g., one second), the controller 190 provides a visual effect by deforming the portion around the touch spot 1650. For example, as shown in FIG. 16A, the controller 190 deforms the portion around the spot 1650 in the first form of concentric circles 1660. The first form of concentric circles 1660 (e.g., the size or diameter, the gradation in color, the transparency, the brightness, etc.) may be varied according to the contact period of time, the strength of the touch, or other factors. After deforming the portion around the spot 1650 in the first form of concentric circles 1660, if the controller 190 detects a touch exceeding a second contact period of time (e.g., one second) at the same spot 1650, it deforms the portion around the spot 1650 in a form that differs from the first form of concentric circles 1660. For example, as shown in FIG. 16B, the controller 190 deforms the portion around the spot 1650 in a second form of concentric circles 1670 that is greater in diameter than the first form of concentric circles 1660. After deforming the portion around the spot 1650 in the second form of concentric circles 1670, if the touch is released from the spot 1650, the controller 190 restores the deformed page to the original form of the page and displays the page having the original form.

Figure 17A:
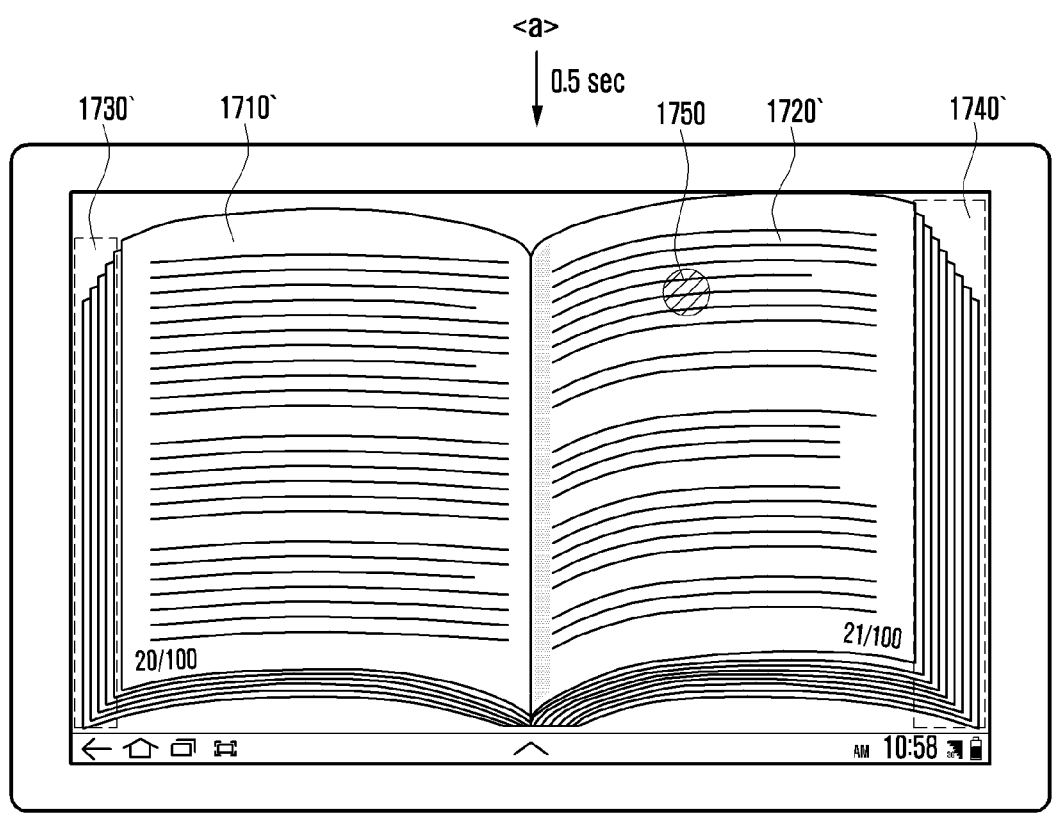
Figure 17B:
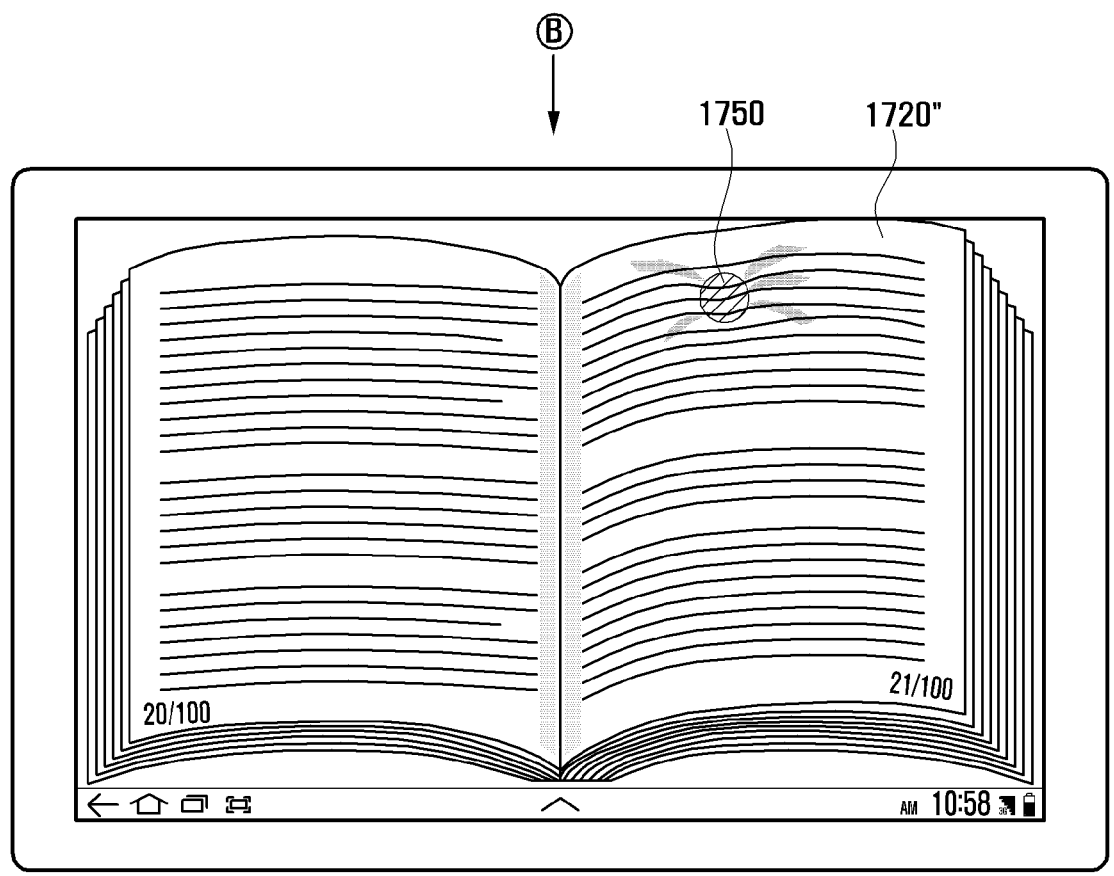

Referring to FIG. 17A, the controller 190 controls the display unit 112 to display one part of pages 1710 and the other part of pages 1720 of an e-book, side by side, in flat form. One part of pages 1710 is located at the left portion of the screen and is called a first part of pages. Likewise, the other part of pages 1720 is located at the right portion of the screen and is called a second part of pages. According to exemplary embodiments, the term 'Displaying pages in flat form' refers to an operation in which the top and bottom edges of the first page of pages 1710 and second part of pages 1720, except for their fore edges, are displayed in parallel as shown in (a) of FIG. 17A. The display unit 112 displays the fore edges 1711 of the first part of pages 1710 on a first volume area 1730, which is called left fore edges 1711. Likewise, the display unit 112 also displays the fore edges 1721 of the second part of pages 1720 on a second volume area 1740, which is called right fore edges 1721. If the controller 190 detects a touch at a spot 1750 in the top left of the first page on the second part of pages 1720, exceeding a first contact period of time (e.g., one second), the controller 190 controls the display unit 112 to display the first part of pages 1710' and second part of pages 1720' corresponding to the first part of pages 1710 and second part of pages 1720, respectively, in a protruding form, as shown in (b) of FIG. 17A. Displaying pages in a protruding form refers to the top and bottom edges of the first part of pages 1710' and second part of pages 1720' being displayed in a protruding curved form and the first volume area 1730' and second volume area 1740' showing the fore edges being accordingly increased as compared to those shown in (a) of FIG. 17A, as shown in (b) of FIG. 17A. Alternatively, the controller 190 may deform only a part of pages corresponding to a page in which a touch is applied in a protruding form and increase the volume area for displaying the fore edges. After deforming the parts of pages and the volume areas described above, if the controller 190 detects a touch exceeding a second contact period of time (e.g., one second) at the same spot 1750 on the second part of pages 1750, the controller 190 provides a visual effect as if the spot 1750 is pressed to the second part of pages 1720, thereby displaying a second part of pages 1720" as shown in FIG. 17B. After that, if the touch is released from the spot 1750, the controller 190 restores the deformed page to the original form of the page and displays the page having the original form.

Referring to FIG. 18, the controller 190 controls the display unit 112 to display pages of an e-book in a protruding form. When the e-book application is executed in the mobile device 100, the controller 190 controls the display unit 112 to display one part of pages 1810 and the other part of pages 1820 of an e-book, side by side, in a protruding form. One part of pages 1810 is located at the left portion of the screen and is called a first part of pages. Likewise, the other part of pages 1820 is located at the right portion of the screen and is called a second part of pages. As shown in (a) of FIG. 18, the pages shown on the one part of pages 1810 and the other part of pages 1820 of an e-book refer to the user's most recently read pages. During the display of pages in a protruding form, the controller 190 increases the first volume area 1830 for the fore edges of the first part of pages 1810 and second volume area 1840 for the fore edges of the second part of pages 1820, respectively, as compared to the areas when the areas are displayed in flat form. If the controller 190 detects a touch at a spot 1821 in the top left of the first page on the second part of pages 1820 and ascertains that the touch period of time exceeds a first preset period of time (e.g., one second), the controller 190 controls the display unit 112 to display the page where the spot 1821 has been subject to the strength of the press (the touch), which is called a second page 1820' of the second part of pages 1820, as shown in (b) of FIG. 18. Although it is not shown in (a) and (b) of FIG. 18, if the controller 190 ascertains, after the first preset period of time has elapsed, that the touch is still maintained at the same spot 1821 until a second preset period of time (e.g., one second) has elapsed, the controller 190 controls the display unit 112 to display the second page 1820" of the second part of pages 1820 as if the second page 1820" has been subject to a strength of press greater than the first page 1820' was subject to. After that, if the touch applied to the spot 1821 is released, the controller 190 restores the deformed page to the original form of the page and displays the page having the original form. Although the page deformations in the form of concentric circles, depressed forms, and various depths, according to the locations where a press is created, the strength of press, the contact period of time by a touch, etc., may be implemented in the respective exemplary embodiments described above with reference to FIGS. 8A to 8B through FIG. 18, it should be understood that each of the exemplary embodiments may be modified in many different ways known to those skilled in the art, including, for example, by combining different features of the above-described exemplary embodiments, or in such a way that the page deformations are created integrally.

FIG. 19 shows the mobile device 100 with a touch screen positioned such that the front side faces upward and the back side faces downward. For example, FIG. 19 may illustrate a state where the user holds the mobile device in his/her hands. The controller 190 controls the display unit 112 to display the first part of pages 1910 and the second part of pages 1920, side by side, on the left and right portions of the screen respectively. The controller 190 calculates the tilt of the mobile device 100 by using information regarding accelerations with respect to X-, Y- and Z-axes, transferred from the sensing unit 185. For example, the controller 190 can calculate a roll angle $\phi$, a pitch angle $\theta$ and a yaw angle $\psi$. The tilt ($\phi$, $\theta$, $\psi$) of the mobile device 100 shown in FIG. 19 is (0, 30, 0). If the controller 190 detects a touch at the spot 1921 in the middle right of the second part of pages 1920, the controller 190 deforms the portion around the spot 1921. As shown in FIG. 19, the controller 190 controls the display unit 112 to display the second part of pages 1920 in such a way that the spot 1921 is pressed in the middle right. The page deformation depends on the location to which a touch is applied, the duration of the touch, etc. That is, the controller 190 deforms the second part of pages 1920 via the acquired touch information. The page deformation may also depend on information regarding the tilt of the mobile device. For example, the degree of deformation of the spot 1921 in the middle right of the second part of pages 1920, e.g., the depressed depth, the shadow, or the like, may vary according to the tilt of the mobile device. That is, the depressed depth or the shadow of the spot 1921 leans more to the gradient direction than the direction opposite to the gradient direction. For example, the spot 1921 is displayed deeper or darker moving in the gradient direction than the direction opposite to the gradient direction. For the sake of convenient description, the exemplary embodiment shown in FIG. 19 is implemented in such a way that the tilt information is acquired with respect to only one axis, i.e., Y-axis, however, it is understood that each of the components of the tilt ($\phi$, $\theta$, $\psi$) may be non-zero. In this case, the mobile device 100 is tilted to the X-, Y- and Z-axes. In this case, the controller 190 can calculate the degree of deformation in a protruding form of pages, based on the tilt information with respect to the three axes.

As shown in FIGS. 8A to 8B through FIG. 19, the controller 190 may provide a shadow effect to a folded portion of a page. To this end, the controller 190 calculates normal vectors from the respective coordinates of a page, and then an angle between the normal vector and a light vector toward the light source. If the calculated angle is less than a preset value (e.g., 10°), the controller 190 identifies that the corresponding coordinates directly face toward the light source and thus processes the corresponding coordinates with a high level of brightness. On the contrary, if the calculated angle is greater than a preset value, the controller 190 identifies that the corresponding coordinates do not receive light from the light source and thus processes the corresponding coordinates with a low level of brightness. It is assumed, according to exemplary embodiments, that the light source is located above and perpendicular to the surface of the pages of an e-book. According to exemplary embodiments, the controller 190 may process the degree of darkness for the folded portion in steps. For example, if the calculated angle is greater than a first preset angle (e.g., 10°) and less than a second preset angle (e.g.,) 20°, the controller 190 processes the coordinates to be slightly dark. If the calculated angle is greater than the second preset angle (e.g., 20°), the controller 190 processes the coordinates to be darker than the previous stage. It should be understood that the pages may also be deformed via a variety of shadow effects.

As described above, the system and method for displaying pages of e-book according to the exemplary embodiments can provide users who read e-books with the same feeling as the feeling of reading a printed book when the users are reading an e-book.

As described above, the page display method according to the exemplary embodiments can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the exemplary embodiments or may be software well-known to the ordinary person skilled in the art. The computer-readable recoding media includes hardware systems for storing and conducting program commands. Examples of the hardware systems are magnetic media such as a hard disk, floppy disk, a magnetic tape, optical media such as a CD-ROM and DVD, Magneto-Optical Media, such as a floptical disk, ROM, RAM, flash memory, etc. The program commands include assembly language or machine code complied by a complier and a higher level language interpreted by an interpreter. The hardware systems may be implemented with at least one software module to comply with the exemplary embodiments.

Although exemplary embodiments have been described in detail hereinabove, it should be understood that many variations and modifications of the exemplary embodiments herein described, which may be apparent to those skilled in the art, will still fall within the spirit and scope of the exemplary embodiments as defined in the appended claims.

What is claimed is:

1. A page display method of a mobile device with a touch screen, comprising:
displaying a page of an e-book on the touch screen in a preset mode;
detecting a touch at a spot on the displayed page;
detecting a press by detecting a contact period of time of the detected touch; and
in response to at least one of a location of the spot and a strength of the detected press, displaying the spot on the page as being deformed with a depth changeable according to a thickness of the page,
wherein the thickness of the page varies according to a type of the e-book.

2. The method of claim 1, wherein the displaying of the spot as being deformed comprises:
displaying the spot as being deeper in a direction moving closer to an inner side of the page.

3. The method of claim 2, wherein the displaying of the spot as being deformed comprises:
displaying the spot as being deeper as the strength of the press becomes greater.

4. The method of claim 3, wherein the displaying of the spot as being deformed comprises:
displaying the spot as being deformed according to a total number of pages of the e-book.

5. The method of claim 1, wherein the type of the e-book comprises at least one of newspaper, magazine, ticket, pamphlet, business card and sketchbook.

6. The method of claim 1, wherein the displaying of the spot as being deformed comprises:
displaying the spot in the form of concentric circles in which at least one of a size of the concentric circles and a diameter of the concentric circles becomes larger as the strength of the press becomes greater.

7. The method of claim 1, wherein the displaying of the spot as being deformed comprises:
displaying the spot in the form of concentric circles in which at least one of a size of the concentric circles and a diameter of the concentric circles varies according to a period of time that the spot is pressed.

8. The method of claim 1, further comprising:
providing at least one of haptic feedback and a sound effect in response to the press.

9. The method of claim 1, further comprising:
restoring, if the press is released, the page having the deformed spot to a page state before the deforming.

10. The method of claim 1, wherein the displaying of the page of the e-book in the preset mode comprises:
displaying the page in a flat or a protruding form.

11. A page display method of a mobile device with a touch screen, comprising:
displaying pages of an e-book on the touch screen in a flat form;
detecting a touch at a spot on a page of the displayed pages; and
in response to a contact period of time of the touch exceeding a preset period of time, displaying the spot on the page as being deformed with a depth changeable according to a thickness of the page,
wherein the thickness of the page varies according to a type of the e-book.

12. The method of claim 11, wherein the displaying of the spot as being deformed comprises:
in response to the contact period of time by the touch exceeding a first preset period of time, displaying the page in a protruding form; and
in response to the contact period of time by the touch exceeding a second preset period of time, displaying the touched spot in the page having the protruding form as being deformed.

13. A page display method of a mobile device with a touch screen, comprising:
displaying pages of an e-book on the touch screen;
detecting a touch at a spot on a page of the displayed pages;
detecting a press by detecting a contact period of time of the touch;
calculating a tilt of the mobile device; and
in response to the detected press and the calculated tilt, displaying the spot on the page as being deformed with a depth changeable according to a thickness of the page,
wherein the thickness of the page varies according to a type of the e-book.

14. The method of claim 13, wherein the displaying of the spot on the page as being deformed comprises:
displaying a shadow or a depth of the spot as being inclined to the tilted direction, compared to a direction opposite to the tilted direction.

15. A mobile device comprising:
a touch screen which displays pages of an e-book in a preset mode; and
a controller which detects a touch at a spot on a page of the displayed pages and a press by detecting a contact period of time of the touch, and, in response to at least one of a location of the spot and a strength of the detected press, displays the pressed spot on the page as being deformed with a depth changeable according to a thickness of the page,
wherein the thickness of the page varies according to a type of the e-book.

16. The mobile device of claim 15, wherein the controller displays the spot as being deformed by displaying the spot as being deeper in a direction moving closer to an inner side of the page.

17. The mobile device of claim 16, wherein the controller displays the spot as being deformed by displaying the spot as being deeper as the strength of the press becomes greater.

18. The mobile device of claim 17, wherein the controller displays the spot as being deformed in response to a total number of the pages.

19. The mobile device of claim 15, wherein the type of the e-book comprises at least one of newspaper, magazine, ticket, pamphlet, business card and sketchbook.

20. The mobile device of claim 15, wherein the controller provides at least one of haptic feedback and a sound effect in response to the press.

21. A non-transitory computer readable recordable medium, installed in a mobile device with a touch screen, which implements a method for displaying pages, the method comprising:
displaying pages of an e-book on the touch screen in a preset mode;
detecting a touch at a spot on one of the displayed pages;
detecting a press by detecting a contact period of time of the detected touch; and
in response to at least one of a location of the spot and a strength of the detected press, displaying the spot on the page as being deformed with a depth changeable according to a thickness of the page,
wherein the thickness of the page varies according to a type of the e-book.

* * * * *